United States Patent
Hudis et al.

(10) Patent No.: US 6,253,195 B1
(45) Date of Patent: Jun. 26, 2001

(54) OPTIMIZED QUERY TREE

(75) Inventors: Irena Hudis, Bellevue; Raymond McCollum, Monroe; Lev Novik, Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/175,813

(22) Filed: Oct. 20, 1998

Related U.S. Application Data

(63) Continuation-in-part of application No. 09/158,171, filed on Sep. 21, 1998.

(51) Int. Cl.[7] .................................................. G06F 17/30
(52) U.S. Cl. ................ 707/2; 707/3; 707/5; 707/101; 707/501; 706/45; 706/50; 709/219; 709/321; 710/104; 711/110; 345/322; 345/346
(58) Field of Search .................................. 707/2, 5, 6–7, 707/100–104, 201–203, 1, 9, 501, 3; 706/45, 50, 59; 710/104; 711/110; 345/346, 422, 327; 370/408; 709/219, 321

(56) References Cited

U.S. PATENT DOCUMENTS

| | | | |
|---|---|---|---|
| 5,574,910 | * 11/1996 | Bialkowski et al. | 707/1 |
| 5,806,061 | * 9/1998 | Chaudhuri et al. | 707/3 |
| 5,937,401 | * 8/1999 | Hillegas | 707/2 |
| 6,078,924 | * 6/2000 | Ainsbury et al. | 707/101 |

OTHER PUBLICATIONS

Aoki, Shinya et al., "Automatic Construction of Tree–structural Image Transformation using Genetic Programming", Proceedings of the 1999 International Conference on Image Processing, ICIP 1999, Oct. 24–28, 1999, vol. 1, pp. 529–533.*

Chaudhuri, Surajit et al., "Optimizating Queries over Multimedia Repositories", Proceedings of the 1996 ACM SIGMOD international conference on Management of Data, pp. 91–102.*

Gandhi, Rajeev et al., "An Efficient Top–Down Approach For The Design of Tree–Structured Orthonormal Filter Banks", Conference Record of the Thirty–Third Asilomer Conference on Signals, Systems, and Computers, Oct. 24–27, 1999, vol. 2, pp. 1627–1631.*

Hsiao, Hui–I et al., "Parallel Execution of Hash Joins in Parallel Databases", IEEE Transaction on Parallel and Distributed System, vol. 8, Issue: 8, Aug. 1997, pp. 872–883.*

* cited by examiner

Primary Examiner—Hosain T. Alam
Assistant Examiner—Shahid Alam
(74) Attorney, Agent, or Firm—Workman, Nydegger & Seeley

(57) ABSTRACT

Systems and methods for constructing and using filtering trees to compare events, data, or other instances of objects defined in an object-oriented schema against one or more query-based definitions. The filtering trees correspond to the logical expressions of one or more query-based definitions, and represent the structure of the computer-executable instructions for comparing events with the definitions. The filtering trees can be traversed so as to simultaneously compare the parameters of an event against multiple logical expressions. The filtering tree is traversed in a top to bottom cascading fashion until a leaf node is encountered in a process that is conceptually equivalent to processing the logical operations associated with the nodes. When a leaf node is encountered, an ordered set of logical values associated with the leaf node indicates which, if any, of the definitions are satisfied by the event. The filtering definitions can be conveniently used to filter events detected by event providers in a computer system so as to identify the event that are to be reported to event subscribers.

31 Claims, 15 Drawing Sheets

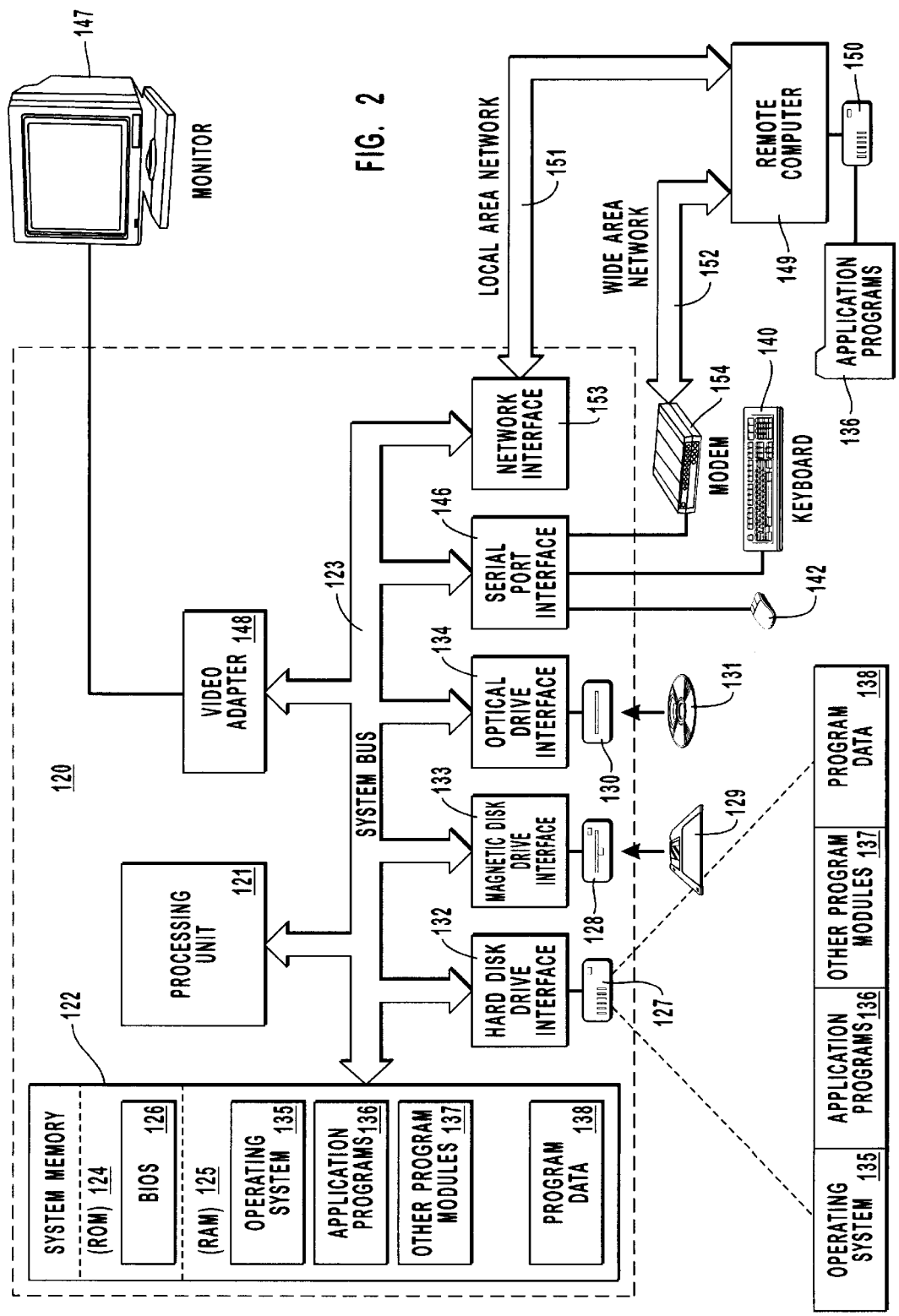

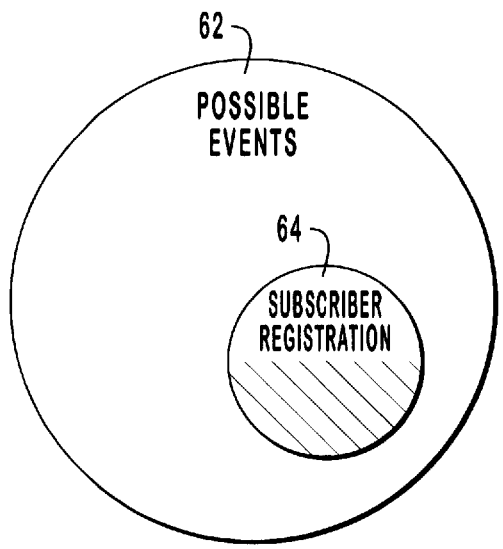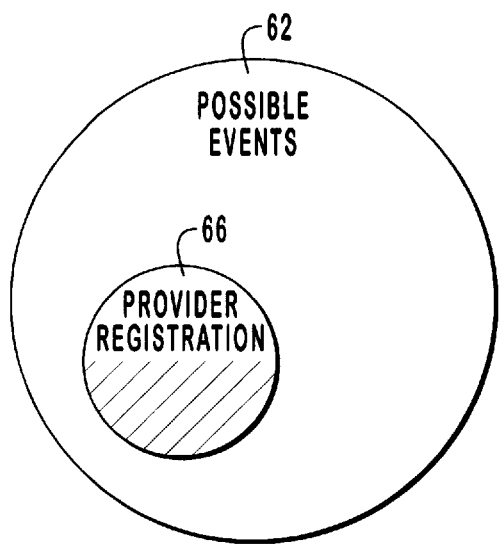
FIG. 5A      FIG. 5B
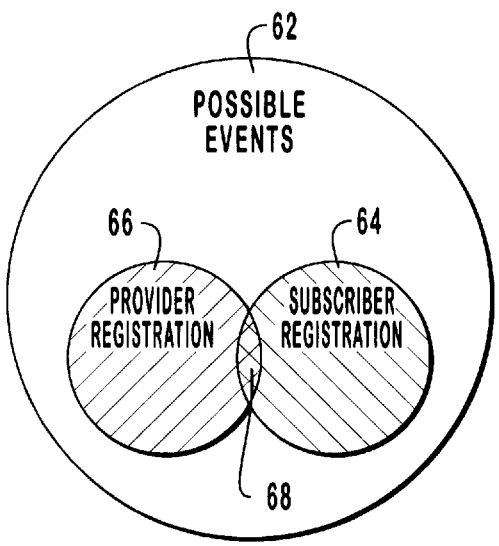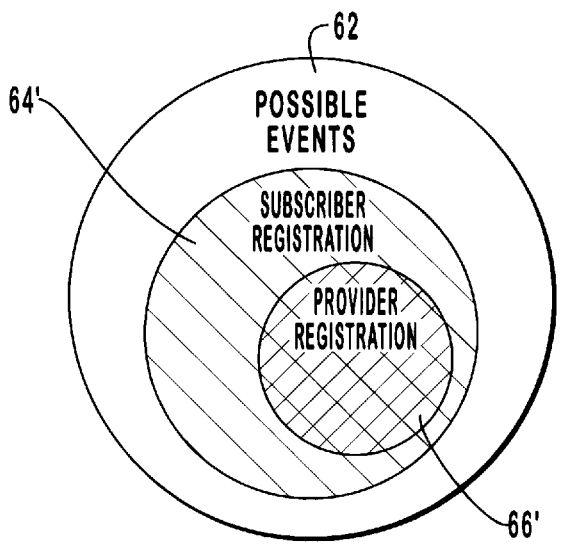
FIG. 5C      FIG. 5D

Q5: TARGETINSTANCE ISA "COMMUNICATION_DEVICE"

Q9: TARGETINSTANCE ISA "WIN32_MODEM"

Q8: TARGETINSTANCE ISA "COMMUNICATION_DEVICE"
Q9: TARGETINSTANCE ISA "WIN32_MODEM"

OPTIMIZED QUERY TREE

RELATED APPLICATION

This application is a continuation-in-part of U.S. patent application Ser. No. 09/158,171, entitled "Using Query Language for Event Filtering and Aggregation," and filed Sep. 21, 1998, which is hereby incorporated by reference.

BACKGROUND OF THE INVENTION

1. The Field of the Invention

The present invention relates to filteringy events, data, or other instances of classes organized in an object-oriented schema. In particular, the present invention relates to constructing and using filtering trees that can be traversed to determine whether an event, data, or another instance satisfies the terms of a query.

2. The Prior State of the Art

Query language has been used for years to define the parameters used to select and retrieve data stored in relational databases. There are many methods and associated algorithms that have been developed to convert a query-based retrieval definition to computer-executable instructions that identify particular data entries in a relational database that satisfy the query-based retrieval definition. Abstract syntax trees are tools that have been developed for graphically representing the logical operations and order of operations that are executed when processing a query-based definition. Abstract syntax trees are one type of filtering tree, and represent procedures by which data or other types of information can be filtered according to logical operations specified, for example, by query-based definitions.

FIGS. 1A–1C illustrate abstract syntax trees associated with conventional methods for processing query-based definitions. While conventional methods for processing query-based definitions have proven adequate in some situations, they often become inefficient when applied to large numbers of separate definitions, as will be more fully described below.

The abstract syntax trees of FIGS. 1A–1C represent operations executed when processing, respectively, the logical expressions of the following three query-based definitions:

Q1)  select * from⟨object⟩
        where $x > 2$ and $y < 3$
Q2)  select * from⟨object⟩
        where $x > 3$
Q3)  select * from⟨object⟩
        where not ($y \geq 5$ and $z > 4$)

In the foregoing query-based definitions, the notation ⟨object⟩ represents any selected object-oriented data class. Turning to FIG. 1A, processing the logical expression of query Q1 is conducted by comparing a data entry in the relational database against the information represented by the nodes of abstract syntax tree 10. Suppose that a first data entry contained in the relational database has x, y and z parameters with the following values:

D1)  $x = 4$;
    $y = 5$; and
    $z = 2$

First, the "and" clause represented by node 11 indicates that both branches that depend therefrom must generate true values for the associated query-based definition to be satisfied. The process of comparing data entry D1 against query Q1 proceeds to node 12 which indicates that the operation to be conducted will involve a "greater than" comparison. Next, nodes 13 and 14 specify that the value of the x parameter is to be compared to the number 2. Because the x parameter of data entry D1 has a value of 4, the first branch consisting of nodes 12–14 generates a true value.

Next, the process steps back to node 12 and proceeds to the second branch, which consists of nodes 15–17. Node 15 indicates that a "less than" operation will be conducted on the second branch. According to nodes 16 and 17, the y parameter of the data entry is to be compared to the number 3. Since the y parameter has a value of 5, the second branch yields a false value. The process steps back to node 10 and, since the second branch has a false value, data entry D1 does not satisfy query Q1.

In view of the foregoing example, it can be seen that the process represented by abstract syntax tree 10 adequately compares a data entry against the associated query in many situations. However, because of the construction of the abstract syntax tree, both branches were traversed before concluding that the data entry did not satisfy the query. It would have been sufficient to discover that the y parameter of data entry D1 did not satisfy the logic of query Q1 without having to consider the x parameter. Thus, the value of the x parameter was unnecessarily compared with query Q1 in the foregoing example.

Referring now abstract syntax tree 18 of FIG. 1B, comparison of data entry D1 against query Q2 involves a "greater than" operation according to node 19. As indicated by nodes 20 and 21, the process further involves comparing the x parameter of data entry D1 with the number 3. Thus, data entry D1 satisfies query Q2.

Comparison of data entry D1 with query Q3 is conducted, as shown by abstract syntax tree 22 of FIG. 1C, by executing a "not" operation depicted at node 23. The "not" operation yields a true value if the branch depending therefrom, which includes nodes 24–30 in this example, is false. The process advances to node 24, which indicates that the branch represents an "and" operation. Nodes 25, 26, and 27 represent an operation by which it is determined whether the y parameter of data entry D1 is greater than or equal to 5. In this example, the y parameter of data entry D1 has a value of 5, such that the branch of nodes 25–27 has a true value. The process steps back to node 24 and then advances to the branch including nodes 28, 29, and 30, which specify that the z parameter of data entry D1 is compared to the number 4 in a "greater than" operation. Because the z parameter has a value of 2, this branch is false. The process agrain steps back to node 24, which yields a false value. Stepping back to node 23, the "not" operation yields a true value, since the "and" operation of node 24 is false.

Abstract syntax trees 18 and 22 adequately compare data entries with the associated queries in many circumstances. However, the configuration of abstract syntax tree 22 required both the y and z parameters to be consecutively considered, whereas the value of the z parameter was sufficient to yield a true value for the abstract syntax tree. A significant disadvantage of the conventional processes for comparing data entries against arises when multiple queries are employed, such as those represented by FIGS. 1A–1C. For instance, queries Q1 and Q2 both relate to the value of an x parameter. When a data entry is processed using abstract syntax trees 10 and 18 of FIGS. 1A and 1B, the x parameter is considered twice. Likewise, the y parameter is separately considered in abstract syntax trees 10 and 22 of FIGS. 1A and 1C, respectively. Executing operations multiple times for the same parameter consumes significant computing resources, particularly when the number of separate query-based definitions is large One can imagine applications in which hundreds of queries or more are processed, resulting in repetitive or nearly repetitive operations on the same parameters.

In view of the foregoing, what is needed are methods for constructing and using filtering trees that combine the logical operations of multiple query-based definitions. Such filtering trees would be particularly advantageous if they could be capable of reducing, or eliminating the repetitive execution of operations on the same parameters that has been practiced using conventional techniques.

SUMMARY AND OBJECTS OF THE INVENTION

The present invention relates to systems and method for constructing and using filtering trees that combine logical operations of multiple query-based definitions. The filtering trees of the invention permit an event detected in a computer system, data, or other instances of objects defined in an object-oriented schema to be compared simultaneously with the multiple query-based definitions. The filtering trees reduce the computing resources and the associated time needed to compare information with the query-based definitions, particularly when the number of definitions is large.

The filtering trees of the invention include a plurality of nodes, and represent a system by which logical expressions associated with multiple query-based definitions are parsed into primitive operations. The nodes of the filtering trees can be related to one another in parent/child relationships. The filtering trees are anary, in that each node can have any number of child nodes. In order to test an instance of an event using a filtering tree, the nodes of the tree are traversed, beginning with a top-level node. Traversing from one node to another is conceptually equivalent to comparing the value of a parameter of the instance of the event against one portion of the logical expressions of one or more of the query-based definitions. Filtering trees of the invention are traversed in a cascading manner from top-level to bottom-level until a leaf node, which specifies the logical value to be assigned to the query-based definitions, is encountered.

The nodes of the filtering trees include the leaf nodes discussed above and non-leaf nodes. Non-leaf nodes correspond to specific parameters included in the logical expressions of the query-based definitions. For example, a top-level non-leaf node may correspond to a selected parameter of one or more of the query-based definitions. When the parameters corresponding to the non-leaf nodes have numerical values, the non-leaf nodes further include a number line divided into segments by one or more critical points. The critical points are selected based on the contents of the logical operations of the query-based definitions. For example, if a first definition included the expression x>3, while a second definition included the expression x<5, the number line associated with the corresponding node would have critical points at x=3 and x=5. Moreover, each critical point and each segment of the number line has a non-leaf or lead node depending therefrom By comparing the value of a parameter against the number line and the critical points of a non-leaf node, more than one query-based definition can be simultaneously processed. Combining portions of related expressions of more than one query-based definition into a single node eliminates the redundancy of repeatedly considering the value of the same parameter as has been practiced using conventional techniques.

The non-leaf nodes that depend from particular critical points or segments of a parent non-leaf node represent additional parameters of the logical expressions of the one or more query-based definitions. Parent and child non-leaf nodes are assembled until they represent all the parameters of the query-based definitions.

Leaf nodes are child nodes depending from parent non-leaf nodes. Each leaf node is associated with a set of logical values (i.e., true and false) that indicate which of the query-based definitions have been satisfied by the particular event being considered.

The filtering trees of the invention provide several advantages over conventional abstract syntax trees and their associated filtering procedures. First, the filtering trees of the invention allow multiple query-based definitions to be simultaneously compared with events, data, and other instances of objects defined in an object-oriented schema. As a result, each parameter is considered only once. Second, in contrast to the methods of traversing conventional abstract syntax trees, the filtering trees of the invention are traversed without retreating or stepping back up branches of the tree that have already been traversed. Instead, the filtering, trees are traversed by cascading down from top-level to bottom-level until the first leaf node is encountered, thereby simplifying the computer-executable instructions associated with the trees. The foregoing features of the invention reduce the computational resources that would otherwise be consumed by using conventional techniques.

The filtering trees are simplified whenever possible to avoid duplicating the same or related operations. Reducing the size of the filtering trees often results in "short-circuiting" the comparison process, whereby some of the operations in one or more of the query-based definitions are not considered, since their execution would not alter the ultimate results of the process. Moreover, the parameter that is represented by the top-level non-leaf node can be selected to minimize the size of the tree and to maximize the frequency of short-circuiting.

The filtering trees of the invention can be particularly useful in the context of detecting events in a computer system and notifying event subscriber hardware or software of the occurrence of selected events. For example, a computer system could detect disk drive activity and errors, installation or deinstallation of hardware components, network server activities and failures, or home, business, or network security breaches, to name just a few.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 is an example system that provides a suitable operating environment for the present invention.

FIG. 5A is a Venn diagram depicting a set of possible events and a subset of events to be reported to an event subscriber.

FIG. 5B is a Venn diagram illustrating a set of possible events and a subset of events to be detected and reported by an event provider.

FIG. 5C is a Venn diagram illustrating the intersection of the subset of FIG. 5A and the subset of FIG. 5B.

FIG. 5D is a Venn diagram illustrating a subset of events reported by an event provider that is subsumed by a subset of events to be reported to an event subscriber.

DETAILED DESCRIPTION OF THE PREFERRED EMBODIMENTS

Figure 1A:
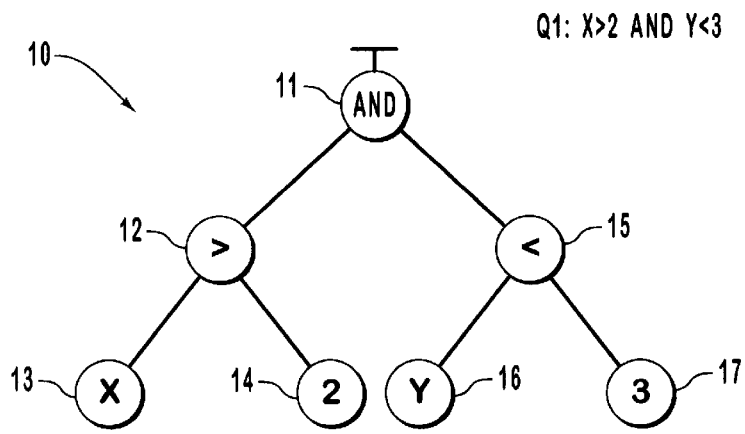
FIGS. 1A–1C illustrate abstract syntax trees representing operations executed to compare a data entry of a relational database with query-based definitions according to conventional techniques.

The present invention relates to systems and method for constructing and using filtering trees that combine logical operations of multiple query-based definitions. The filtering trees of the invention permit information structures to be compared simultaneously with the multiple query-based definitions. Examples of the information structures that can be processed according to the invention include events detected in a computer system, data entries in a relational database, or other instances of objects defined in an object-oriented schema. The filtering trees reduce the computing resources and the associated time needed to compare information with the query-based definitions, particularly when the number of definitions is large.

The invention is described below primarily in the context of filtering events detected in a computer system or in the environment of a computer system. However, the principles disclosed herein are equally applicable to filtering other data, such as data contained in a relational database. Accordingly, the filtering trees of the invention may be constructed and used in any of a variety of applications.

Embodiments within the scope of the present invention include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Suitable Computing Environment

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help to transfer information between elements within the computer 120, such as during start-up, may be stored in ROM 124.

The computer 120 may also include a magnetic hard disk drive 127 for reading from and writing to a magnetic hard disk, not shown, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions, data structures, program modules and other data for the computer 120. Although the exemplary environment described herein employs a magnetic hard disk 127, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129. optical disk 131, ROM 124 or RAM 125 including an operating system 135, one or more application programs 136, other program modules 137, and program data 138. A user may enter commands and information into the computer 120 through input devices such as a keyboard 140 and pointing device 142. Other input devices (not shown) may include a microphone, joy stick, game pad, satellite dish, scanner, or the like. These and other input devices are often connected to the processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as video adapter 148. In addition to the monitor, personal computers typically include other peripheral output devices (not shown), such as speakers and printers.

Computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to the computer 120, although only a memory storage device 150 has been illustrated in FIG. 2. The logical connections depicted in FIG. 2 include a local area network (LAN) 151 and a wide area network (WAN) 152 that are presented here by way of example and not limitation. Such networking environments are commonplace in offices enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof; may be stored in the remote memory storage device. It will be appreciated that the network connections shown are exemplary and other means of establishing a communications link between the computers may be used.

System Overview

The invention is described herein primarily in the context of constructing and using filtering trees to select particular events detected by an event-filtering component so that an event subscriber can be notified of the occurrence of the selected events. The term "filtering tree", as defined herein, includes conceptual, computer-executable, or graphical representations of systems and methods for comparing query-based definitions with events, data, or other instances of objects defined in an object-oriented schema. As further described herein, the filtering trees of the invention can include a plurality of nodes that represent specific logical operations included in one or more of the query-based definitions.

Events may be reported from event-filtering components, or cores, to any desired "event subscriber", which is defined herein as any hardware component, software component, program module, peripheral, or the like, capable of being notified of the occurrence of events. Event subscribers can be management computer programs or any other event consumer. Event subscribers can be local or instead can be located remotely and communicate with the event-filtering component by means of a network infrastructure.

As used herein, the term "event" is to be given its ordinarily understood meaning, and can refer to an event occurring in a computer, a computer network, or the environment of a computer. For example, events can refer to activity in hardware or software components, and can also include installation, deinstallation, or modification of hardware or software components.

The term "event provider", as used herein, extends to hardware or software components that can report the occurrence of events to the event-filtering components of the invention. For example, event providers are often programs or program modules operating in user mode in a computer system. Event providers are typically notified of the occurrence of events by "event-detection components", which is defined herein to include operating systems and drivers operating in kernal mode and other instrumentation for directly measuring, monitoring, or detecting events in computers, computer networks, or the environment of a computer system. The term "computer system" extends to any computer or computer network, either alone or in combination with peripherals or other hardware.

As used herein, the term "reporting" in reference to events includes the act of notifying a hardware or software component of the occurrence of one or more events. Delivering notification of the occurrence of an event from an event-filtering component to an event subscriber and publishing events by event providers are both examples of event reporting.

Figure 3:
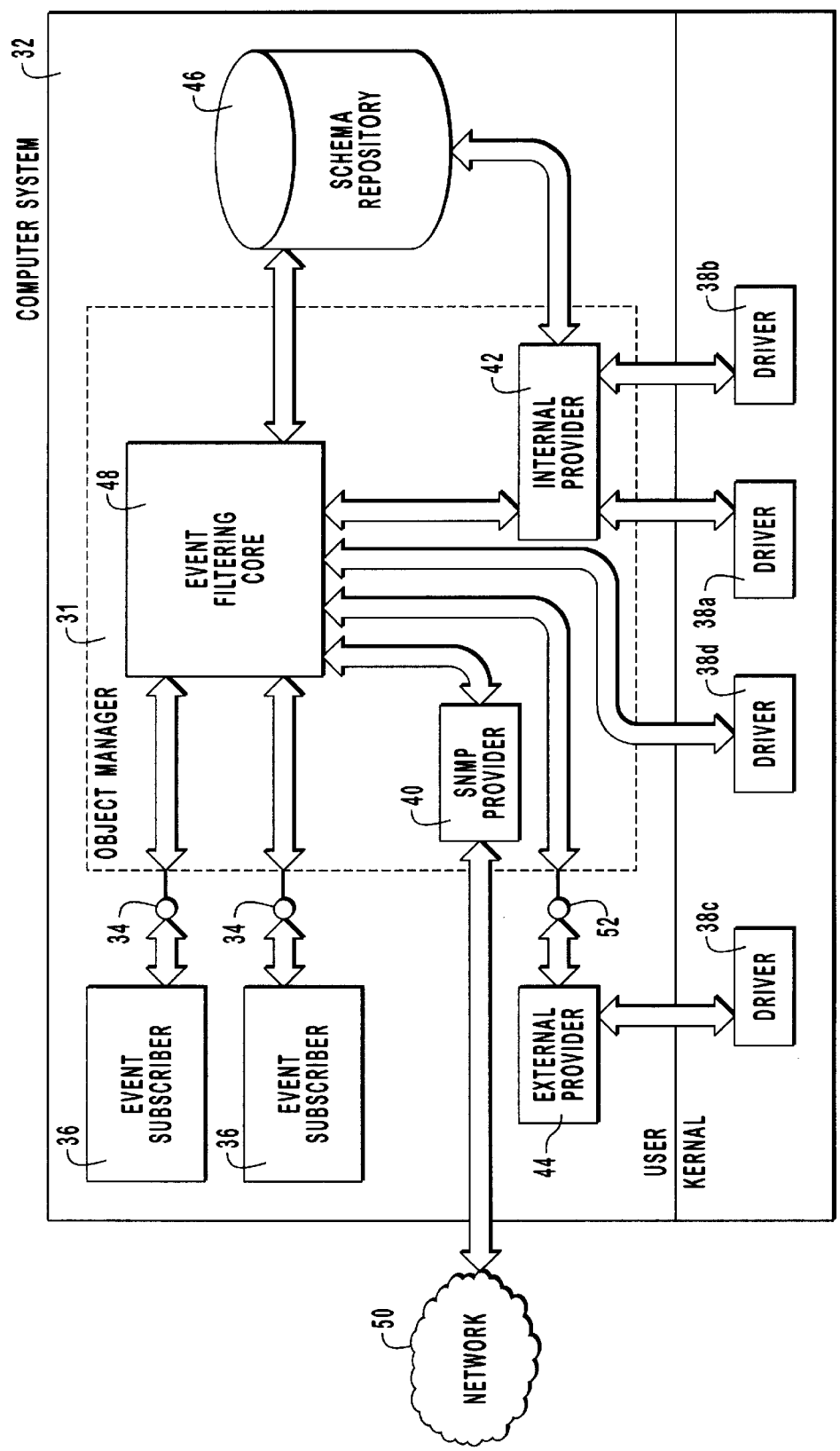
FIG. 3 is a schematic diagram illustrating a system of the invention for filtering events detected in a computer system and reporting the filtered events to an event subscriber.

FIG. 3 is a schematic diagram depicting one embodiment of a computer system in which the filtering trees of the invention can be constructed and used. Computer system 32 includes an object manager 31 having a standard interface 34 through which it can communicate with one or more event subscribers 36. In this embodiment, object manager 31 has another standard interface 52 through which it can communicate with one or more external event providers 44. The occurrence of events is reported to an event-filtering core 48 of object manager 31 by drivers 38, SNMP provider 40, internal event provider 42, external event provider 44, or other instrumentation.

SNMP provider 40 reports the occurrence of events on a network, such as network 50, using a standard protocol well-known in the art. Internal provider 42 is internal in the sense that it is integrated with object manager 31 and can communicate with other components of the object manager without the use of a communications hub or similar hardware. In this example, SNMP provider 40 is another example of an internal event provider. When object manager 31 is practiced in a Windows NT environment, for example, internal providers 42 can include Win32 event providers and Windows Management Instrumentation (WMI) providers.

Although object manager 31 may be equipped with internal providers 42 as described above, the invention is particularly useful for reporting events detected by one or more external event providers 44. External event provider 44 is external in the sense that it communicates with the object manager 48 via a communications link and a standardized interface 52. External provider 44 may be written by a manufacturer different from the supplier of object manager 31. In this manner, any original equipment manufacturer (OEM) can extend the driver that controls the function of its hardware to include an external event provider 44 that can communicate with object manager 31 via standardized interface 52. Indeed, object manager 31 and event-filtering core 48 allow events to be efficiently reported to event subscribers 36 without the manufacturers of external providers 44 and the manufacturers of the event subscribers having a detailed knowledge of one another.

As shown in the example of FIG. 3, events detected by event drivers 38a and 38b are reported to event-filtering core 48 by internal provider 42. Events detected by event driver 38c are reported by external provider 44, while events occurring on network 50 are reported by SNMP provider 40. Drivers 38a–d are examples of event-detection components. The systems of the invention can also report events detected by drivers or other instrumentation without the assistance of intermediate event providers in a polling operation that is discussed in greater detail below. For example, driver 38d has no associated event provider. Instead, object manager 31 periodically communicates directly to driver 38d to learn of the occurrence of events detected thereby.

In one embodiment of the invention, a schema repository 46 defines an object-oriented, hierarchical classification of event classes. The event classes allow event-filtering core 48 to efficiently determine the scope of the events that are to be reported to event subscribers 36 and the events that may be reported by event providers 40, 42, and 44. The Common Information Model (CIM), which is an industry standard for classifying data established by the Desktop Management Task Force (DMTF), is just one example of a suitable schema for use with the invention. Event classifications are described in greater detail below in reference to FIG. 4.

Event providers 40, 42, and 44 send notifications to event-filtering core 48 of the occurrence of events, and the event-filtering core then filters the events to identify those that are to be reported to one or more of the event subscribers 36. In one embodiment, the filtering is conducted by comparing the event classes of the events and parameters of the events to event-filtering definitions, which can be written in a query language. The event classifications defined in schema repository gives context to query-based filtering definitions, thereby allowing event-filtering core 46 to filter the events. Event filtering is described in greater detail below in reference to FIGS. 5A–13.

Event Classification

Figure 4:
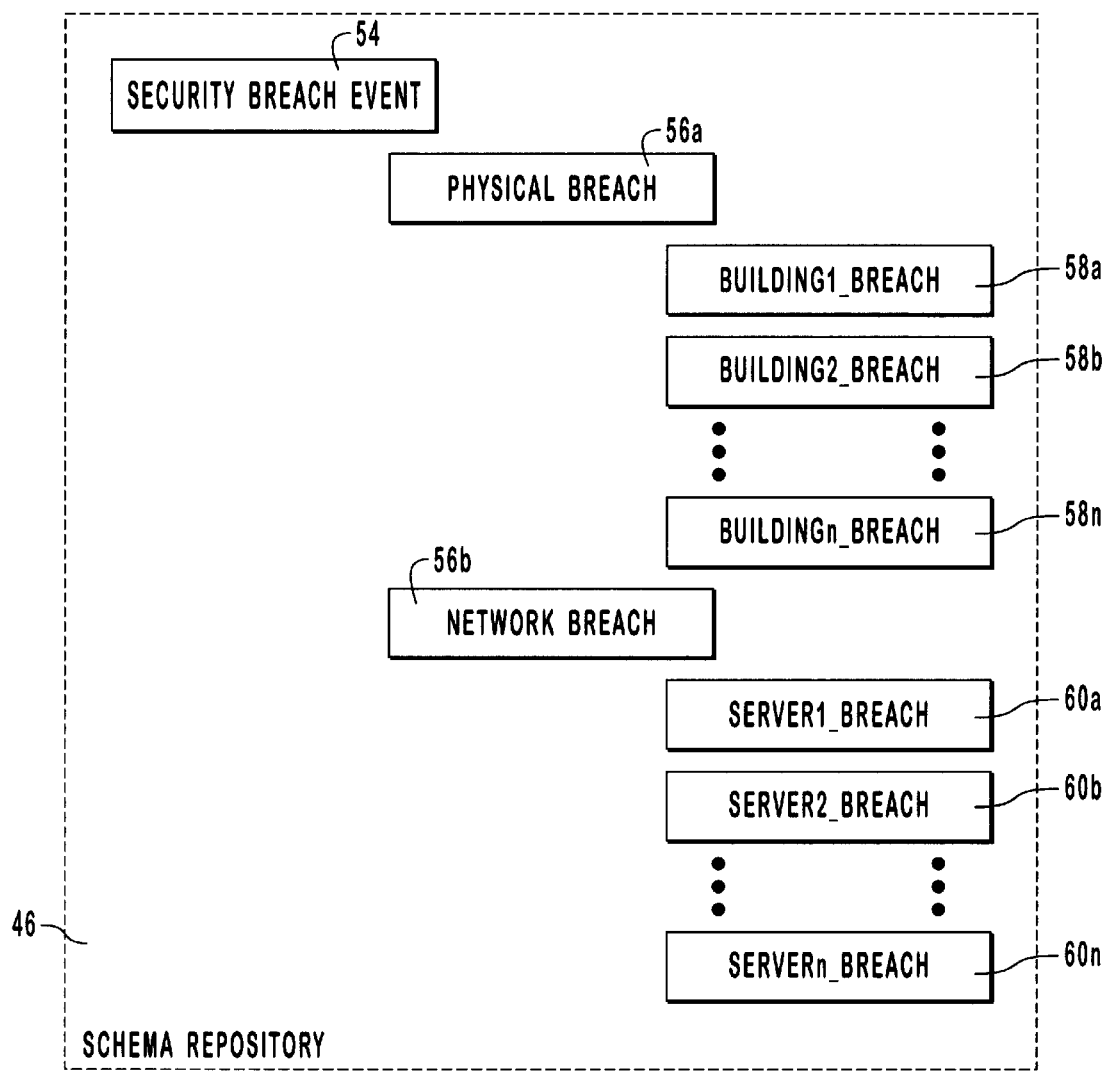
FIG. 4 shows an example of a portion of a schema that defines a hierarchical classification of event classes.

As shown in FIG. 4, embodiments of the systems of the invention include a schema repository 46 that defines an object-oriented, hierarchical classification of event classes. The classification defined in schema repository 46 may be very similar in structure to schema defining relational data base objects. In one embodiment, each event that is reported to event-filtering core 48 of FIG. 3 belongs to one or more event classes defined in a schema repository 46. Accordingly, the event classes defined in schema repository 46 comprehend a set of possible events that can be reported to event-filtering, core 48 by event providers 40, 42, and 44 or by other sources.

As will be further discussed in reference to FIGS. 5A–10, event definitions, which may be written in query language, define a subset of the set of possible events comprehended by the event classes defined in a schema repository 46 of FIG. 4. A schema defined in schema repository 46 of FIG. 4 may be as detailed as desired and can be constructed to relate to the types of events that are to be detected by the computer system. As noted herein, the CIM schema or an extension thereof can be used with the invention. The schema can instead be defined by the entity that creates object manager 31 or can be an extension of a previously existing schema. In order for event subscribers 36 and event providers 40, 42, and 44 to be compatible with the systems of the invention, regardless of their manufacturers, it can be useful to publish any particular event classification that is used in a system operating according to the invention.

To illustrate the structure of an event classification, FIG. 4 includes a portion of a classification directed to the detection of security breaches in buildings or networks. It should be understood that the event classes illustrated in FIG. 4 are presented for illustration purposes only and that the event classes in any particular system can be selected to include the types of events to be detected by the computer system.

A first level event class 54 is defined in this example as SecurityBreachEvent. Two second level, children event classes 56a and 56b depend from a parent event class 54. In this example, event class 56a is defined as PhysicalBreach and event class 56b is defined as NetworkBreach. Event class 56a is itself a parent with respect to third level, children event classes 58a–n, which are defined as Building1-$n_{13}$ Breach, respectively. Likewise, event class 56b is a parent to third level, children event classes 60*a–n*, which are defined as Servers1-n__Breach, respectively.

In this embodiment, each event class can be defined to have any desired parameters. For example event classes 58*a–n* (Building1-n__Breach) can each be defined:

> C1) Class Building[X]_Breach
>
>   sint 32 Entrance
>
>   string ResponsibleParty In the foregoing example [X] represents the number of the building. The parameters "Entrance" (signed integer) and "ResponsibleParty" (string) are associated with event classes 58*a–n* (Building1-n__Breach). Accordingly, when an event belonging to one of event classes 58*a–n* is reported to event-filtering core 48, the instance of the event includes arguments representing the values of the parameters Entrance and ResponsibleParty.

As event providers 40, 42, and 44 notify event-filtering core 48 of the occurrence of the events dealing with security breaches, each event will belong to at least one of the event classes illustrated in FIG. 4. For example, if a system operating according to the invention detects an event consisting of a breach of security in building 2, that event belongs to event class 58*b*. Because event class 58*b* is a child of event class 56*a*, which in turn is a child of event class 54, the detected event also belongs to event classes 56*a* and 54.

Event-Filtering and Event-Reporting Definitions

In order to filter the events reported from event providers 40, 42, and 44 to select the events to be reported to event subscribers 36, event-filtering core 48 maintains, in one embodiment of the invention, event-filtering definitions associated with each event subscriber. While the event-filtering definitions can be any mechanism for selecting only the events to be reported to particular event subscribers 36, in one embodiment the definitions are constructed in a query language written in the context of the event classification stored in schema repository 46. Any query language can be used according to the invention. By way of example and not limitation, the query language may be Structured Query Language (SQL), which may be modified or extended as desired.

In the Venn diagram of FIG. 5A, the set of possible events 62 includes the events comprehended by the event classes of the event classification. In reference to the schema in the example of FIG. 4, the set of possible events 62 of FIG. 5A includes at least any security breach event. In general, depending on the types of drivers, event providers, or other instrumentation associated with the computer system, the occurrence of any of the possible events 62 can be reported to the event-filtering core.

In this embodiment, each event subscriber 36 registers with the event-filtering core 48 by providing a subscriber registration 64 that includes the associated event-filtering definition, thereby indicating which events are to be reported to the event subscriber. In other words, the event-filtering definition designates with of the possible events are subscriber-requested events. As shown in FIG. 5A, subscriber registration 64 defines a subset of the set of possible events 62. As used herein, "subset" can be smaller or coextensive with the set in which it is subsumed.

In one example, subscriber registration 64 may comprise the event-filtering definition:

> Q4) select*from SecurityBreachEvent.

In this case, event-filtering core 48 would interpret the event-filtering definition as a request to receive a report of the occurrence of any event belonging to class 54 of FIG. 4. Accordingly, when event-filtering core 48 receives, from any event provider, a report of an event belonging to event class 54 or any of the children event classes 56*a*, 56*b*, 58*a–n*, or 60*a–n*, the event is reported to the event subscriber associated with the definition. As shown in FIG. 5A, the subscriber registration subset 64 associated with the foregoing event-filtering definition would include all of the possible events 62 that are classified under event class 54 or any of its children classes.

The event-filtering definition:

> Q5)  select * from Building2_Breach
>
>   where Entrance > 3 limits the requested subset of events 64 to those belonging to event class 58*b* (Building2_Breach) and having an Entrance parameter greater than 3 (e.g., indicating that the security of an entrance # 4, 5, 6 . . . or n of Building 2 has been breached). Events not satisfying the "where" clause of query Q5 or, in other words, those not having an a value of the Entrance parameter that satisfies the where clause, do not belong to the subset of events defined by query Q5 and are not reported to the associated event subscriber.

In one embodiment of the invention, each event provider 40, 42, and 44 also registers with event-filtering core 48 by supplying a provider registration 66 that includes an associated event-reporting definition, thereby guaranteeing to the event-filtering core that any event reported by the particular event provider will satisfy the definition. Like the event-filtering definitions, the event-reporting definitions can be written in the query language. Referring to FIG. 5B, the event-reporting definition of the provider registration defines a subset 66 of the set of possible events 62.

For example, provider registration 66 may comprise the event-reporting definition:

> Q6)select*from NetworkBreach which indicates that any event reported by the associated event provider will belong to event class 56*b* or to any of the children classes 60*a–n*.

The event-reporting definition:

> Q7)  select * from Building2_Breach
>
>   where Entrance < 5 indicates that the associated event provider will only report events belonging to class 58*b* (Building2_Breach) and having an Entrance parameter less than 5 (e.g., indicating that the security of an entrance # 1, 2, 3, or 4 of Building 2 has been breached).

In another example, an event subscriber could register the following event-filtering definition with the event-filtering core:

> Q8)  select * from SecurityBreachEvent

-continued where (Building<> 8 and Severity < 3) or Severity < 2

In this example, event class SecurityBreachEvent is associated with parameters Severity and Building. This query specifies that the associated event subscriber is to be notified of security breach events having a Severity parameter value of 1 or 2 in all buildings other than building 8, and of security breach events having a Severity parameter value of 1 in building 8.

In order to further illustrate the capabilities of the query-based event-filtering definitions, the additional examples are presented below. In the following discussion, "instrinsic" events include those that relate to the creation of data with respect to the configuration of a computer or a computer network. For example, events consisting of the installation, deinstallation, or modification of a hardware or software components are ail intrinsic, since their occurrence causes the configuration of the system to change. In contrast "extrinsic" events are those that relate to activity in or in the environment of a computer or computer network, but do not relate to the configuration of the computer or computer network. Examples of extrinsic events include disk drive activity and errors, network server activity and failure, and security breaches.

In order to monitor installation, deinstallation, and modification of hardware and software components, the event classification in the schema repository could be supplemented with intrinsic event classes directed to the installation, deinstallation, and modification of hardware and software components. Intrinsic event classes could be defined as follows:

C2) class InstanceCreationEvent
    object TargetInstance;

C3) class InstanceDeletionEvent
    object TargetInstance where TargetInstance is a parameter of the classes InstanceCreationEvent and InstanceDeletionEvent, and which has, as its value, an object-oriented data class specifying the hardware component or software component installed.

Data classes could be defined as follows:

C4) class Win32_Modem;

C5) class Video_Card;

C6) class Win32_Service;

and so forth, each being associated with the specified hardware or software component. Moreover, the data classes can be associated one with another in parent/child relationships. For example, each data class that relates to a hardware component can have child classes specifying particular manufacturers.

In one example, an event subscriber could register the event-filtering definition:

Q9) select * from_InstanceCreationEvent where TargetInstance is a "Win32_Modem" and -continued (TargetInstance.Manufacturer = "USRobotics" or TargetInstance.Manufacturer = "Hayes")

The foregoing query illustrates the use of an operator "isa", which associates a parameter of the event class with a selected data class. In this example, the operator "isa" associates the parameter TargetInstance with the specified data class Win32_Modem. This query would result in the event subscriber being notified of the installation of Win32 modems manufactured by US Robotics or Hayes.

In yet another example, an event subscriber could register the event-filtering definition:

Q10) select * from InstanceDeletionEvent where TargetInstance isa "Win32_Service" and not TargetInstance.State = "Running"

The foregoing query specifies that the event subscriber is to receive notification of the deinstallation of a Win32 service that is not in a running state.

The event-filtering definitions and event-reporting definitions facilitate the filtering of events as they are received from the event providers. Referring to FIG. 5C, the intersection 68 of subsets 64 and 66 represents for example, the events defined by query-based definitions Q5 and Q7, above. In particular, query Q5 (i.e., subset 64) specifies that any event associated with a security breach of an entrance # 4, 5, 6 . . . or n of Building 2 is to be reported to the associated event subscriber 36. Similarly, query Q7 (i.e., subset 66) indicates that the associated event provider will report only security breaches of an entrance #1, 2, 3, or 4 of Building, 2. The intersection 68 of queries Q5 and Q7 indicates in this example that when an event of a security breach of entrance 4 of Building 2 is reported by the event provider, that event is reported to the event subscriber. If other events requested by the event subscriber are to be reported (e.g., breach of entrance 5, 6 . . . n of Building 2), the event must be detected by another event provider.

The event-reporting definitions associated with the event providers can greatly simplify the filtering process in many cases. For example, consider an event subscriber associated with query Q4 and an event provider associated with query Q6. In this case, as illustrated by FIG. 5D, the subset of events 66' that satisfy query Q6 are subsumed within the subset of event 64' that satisfy query Q4. In this case, any event supplied by the event provider necessarily satisfies the event-filtering definition associated with the event subscriber. Accordingly, the event-filtering core 48 does not need to analyze the particular parameters or event class of the event provided according to query Q6, but instead can always report the event to the event subscriber.

Furthermore, the event-reporting and event-detecting definitions allow event providers 40, 42, and 44 to be activated only when there is an event subscriber 36 interested in receiving, reports from the event provider. For example, consider a situation in which only queries Q5 and Q6 are registered with the event-filtering core 48. In this case, there is no event subscriber 36 registered with event-filtering core 48 that is interested in any event that could be reported by the event provider associated with query Q6. In particular, the event subscriber associated with query Q5 is not interested in learning of any event classified under event class 56b (NetworkBreach) or any of its children event classes 60a–n (Server1-n_Breach). Accordingly, the particular event provider is not activated until such time that an interested event subscriber registers with the event-filtering core.

Filtering Trees

Figure 6A:
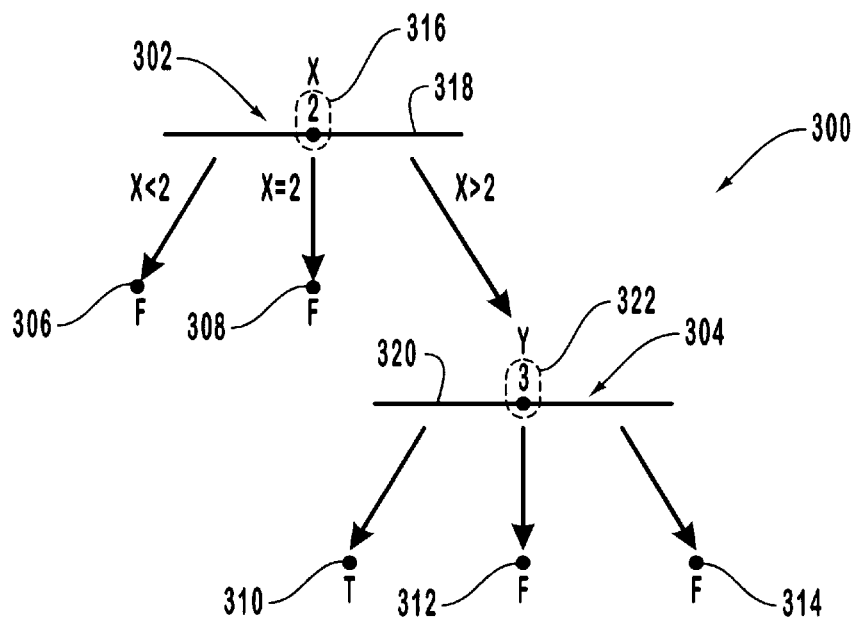
FIGS. 6A and 6B illustrate filtering trees for comparing events, data, or the like against a first and a second query, respectively.

FIGS. 6A–9C illustrate examples of filtering trees constructed according to the invention. The principles relating to the construction and use of the filtering trees and the advantages thereof may be best understood by reviewing the examples disclosed hereinbelow. FIG. 6a depicts a filtering tree representing the logical expression of query Q1:

Q1) select * from ⟨object⟩ where $x > 2$ and $y < 3$

In particular, the logical expression of query Q1 is "x>2 and y<3". The conjunctive operator "and" indicates that any event satisfying the query must have an x parameter greater than 2 and a y parameter greater than 3.

Filtering tree 300 includes a plurality of non-leaf nodes 302 and 304 and a plurality of leaf nodes 306, 308, 310, 312, and 314. As used herein, the term "non-leaf node" shall refer to a node in a filtering tree that has one or more nodes depending therefrom. The term "leaf node" shall refer to a node in a filtering tree that has no node depending therefrom. A child node depends "directly" from a parent (non-leaf) node when there is no intervening node between the child and parent. A child node depends "indirectly" from a parent when there is at least one intervening node therebetween.

Each non-leaf node represents a decision made during the process or traversing the filtering tree, which is conceptually equivalent to comparing an event with the query-based definitions associated with the filtering tree. For example, referring to node 302, the value of the x parameter of the event being processed using filtering tree 300 determines whether the procedure advances to node 304, 306, or 308. Traversing the filtering tree commences with top-level node 302 and proceeds in a cascading fashion from top to bottom until a leaf node is encountered. Each leaf node represents a logical value to be assigned to the query-based definition associated with the filtering tree. For instance, leaf node 306 represents a false value. Thus, when leaf node 306 is encountered during a process of traversing filtering tree 300, query Q1 is found to be false.

To construct filtering tree 300, one of the parameters included in the logical expression is selected to be represented in top-level node 302. In this example, the x parameter has been selected. While the choice between the x parameter and the y parameter is arbitrary in FIG. 6A, in more complex filtering trees, the parameter selected for the top-level node may effect the efficiency of the filtering process. The considerations and factors used to select the top-level parameter are discussed in greater detail below.

Top-level node 302 has a critical point 316 designated thereon. Critical point 316, which has a value of 2, represents the number to which the x parameter is compared in the logical expression of query Q1. Critical point 316 is situated on a number line 318 at top-level node 302. In effect, critical point 316 divides number line 318 into two segments: x<2 and x>2. In the example of FIG. 6A, the two segments x<2 and x>2 and critical point 316 (x=2) constitute the distinct regions of number line 318 on which an x parameter being compared to query Q1 can fall. Each of the three distinct regions of number line 318 is associated with a child node 304, 306, or 308. Thus, when filtering tree 300 is traversed, the x parameter of the event is compared with number line 318 of node 302. Depending on the value of the x parameter, the process advances to one of nodes 304, 306, and 308.

Because query Q1 includes the conjunctive operator "and", any event satisfying the query must have an x parameter greater than 2 and a y parameter less than 3. It can be understood that if an x parameter has a value less than 2 or equal to 2, query Q1 is necessarily false, regardless of the value of the y parameter Thus, leaf nodes 306 and 308 are assigned a "false" value and are situated as child nodes depending the x<2 and x=2 regions of top-level node 302. When filtering tree is traversed with respect to an event having an x parameter less than or equal to 2, the process advances to and terminates at one of the leaf nodes 306 and 308, thereby "short-circuiting" the comparison process without requiring the y parameter to be considered at all. This feature of filtering tree 300 illustrates a general principle the filtering trees of the invention, namely, that leaf nodes are placed in the filtering trees to preempt the unnecessary consideration of any parameter. Such short-circuiting reduces the computing resources and time otherwise needed to compare events with query-based definitions.

Non-leaf node 304 of FIG. 6A indicates that when an event has an x parameter greater than 2, query Q1 will be true or false depending on the value of the y parameter. In other words, the process remains indeterminate until the y parameter is considered. Node 304 has a number line 320 and a critical point 322 (y=3) designated thereon to represent the expression "y<3" of query Q1. Number line 320 and critical point 322 are constructed as discussed above in reference to number line 318 and critical point 316 of node 302.

The resulting three regions of number line 320 (y<3, y=3, and y>3) are each associated with a leaf node that sets forth the results of the process of comparing the event with query Q1. In particular, node 310, which depends from the region y<3, has a true value, whereas nodes 312 and 314 depending from regions y=3 and y>3, respectively, have false values.

Figure 1B:
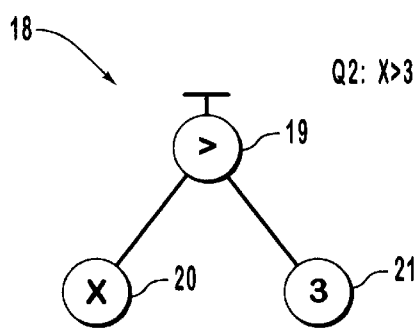
Figure 1C:
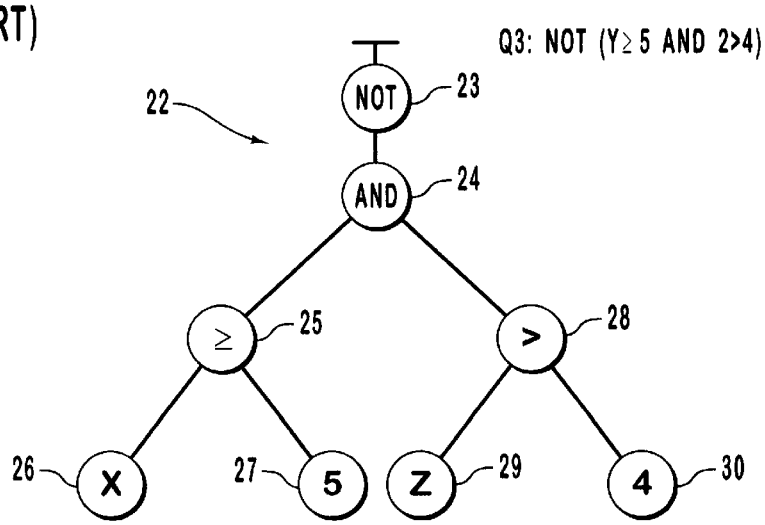

Filtering tree 300, which represents a single query Q1, can be traversed in a process that is simpler than conventional processes of traversing abstract syntax trees as illustrated in FIGS. 1A–1C. In particular, filtering tree 300 is traversed in a cascading fashion until any one leaf node is encountered. There is no need to step back up a branch from child node to parent node, in contrast to the processes of traversing abstract syntax trees 10, 18, and 22 of FIGS. 1A–1C.

Figure 6B:
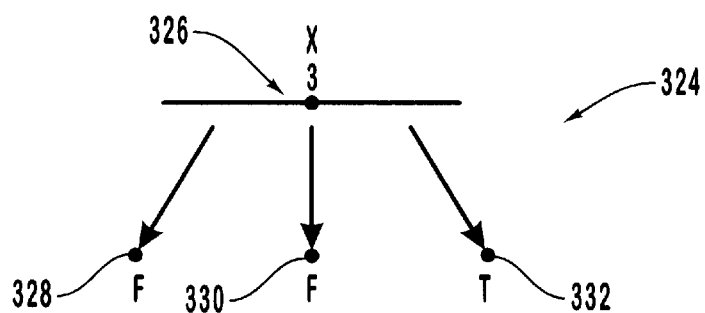

FIG. 6B depicts a filtering tree 324 representing the logical expression "x>3" of query Q2:

Q2) select * from⟨object⟩ where $x > 3$

Filtering tree 324 is constructed in much the same manner as described above in reference to filtering tree 300 of FIG. 6A. In the case of filtering tree 324 of FIG. 6B, there is only one non-leaf node (node 326), which has three leaf nodes 328, 330, and 332 depending therefrom. The single non-leaf node 326 reflects the fact that whether query Q2 is satisfied requires consideration of only the x parameter of an event.

Figure 6C:
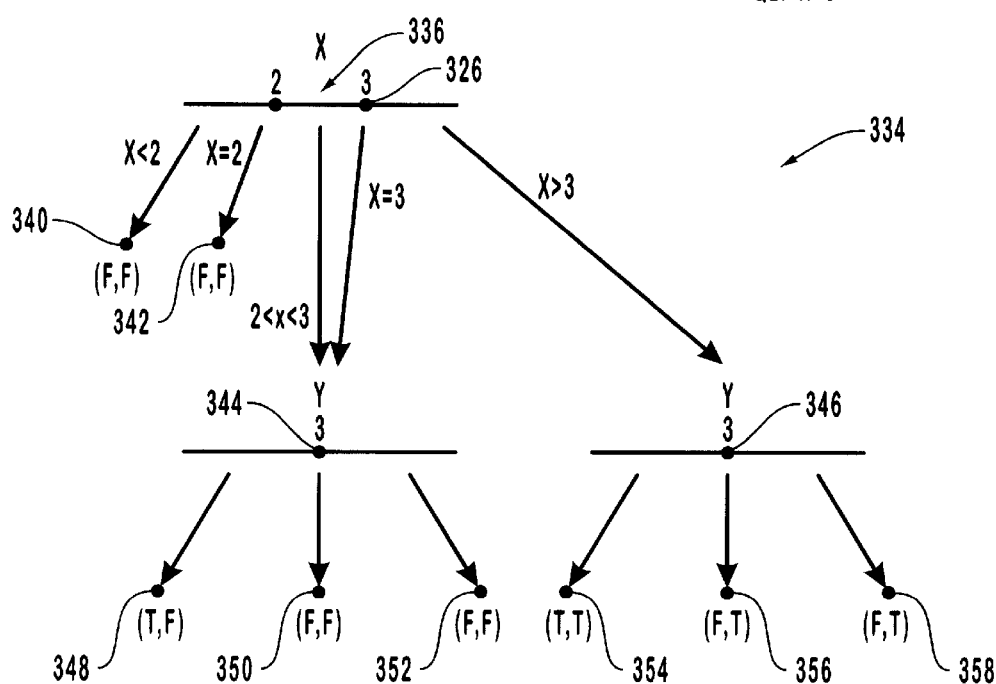
FIG. 6C illustrates a filtering tree that combines the logical operations of the first and second queries of FIGS. 6A and 6B.

FIG. 6C illustrates a filtering tree 334 that represents a combination of filtering tree 300 of FIG. 6A and filtering tree 324 of FIG. 6B. The ability to combine filtering trees and to allow the logical operations of multiple queries to be simultaneously processed is a significant advantage of the present invention. For example, queries Q1 and Q2 each include a logical operation relating to the x parameter of an event. Using filtering tree 334, the x parameter of the event needs to be compared to only one node 336 to determine whether it satisfies the conditions of both queries.

Node 336 includes two critical points 316 and 326, representing the points on number line 338 at x=2 and x=3, respectively Critical points 316 and 326 produce five distinct regions on number line 338 with respect to the logical operations of queries Q1 and Q2: x<2, x=2, 2<x<3, x=3, and x>3. Depending on the value of the x parameter an event, the process of traversing filtering tree 334 advances from node 336 to any one of the nodes depending from the five distinct regions of number line 338.

A shown in FIG. 6C, leaf nodes 340 and 342 depend from the regions of number line 338 of node 336 at which the values of both query Q1 and query Q2 are determinate without having to consider the y parameter. In particular, queries Q1 and Q2 are necessarily false if the x parameter of an event is less than 2 or equal to 2. Leaf nodes 338 and 340 include an ordered set of logical values to be assigned to queries Q1 and Q2 upon the leaf nodes being encountered during the traversing process.

Node 336 has two non-leaf nodes 344 and 346—each associated with the y parameter—depending from distinct regions of number line 338. Node 344 depends from the distinct regions 2>x>3 and x=3 of number line 338. In either of the foregoing regions, query Q2 has already been determined to be false, whereas the value of query Q1 has yet to be determined. Likewise, node 346 depends from the distinct region x>3 of number line 338. At this region, query Q2 is necessarily true, so that the only remaining question is again the value of query Q1. Accordingly, node 344 has three leaf nodes 348, 350, and 352 depending therefrom, while node 346 has three leaf nodes 354, 356, and 358 depending therefrom. Each of the leaf nodes 348–358 includes the appropriate ordered pair of logical values of queries Q1 and Q2.

Figure 6D:
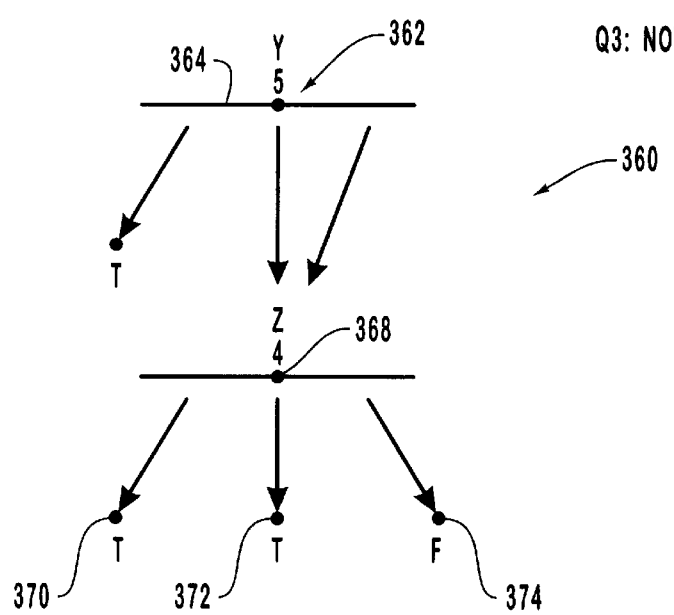
FIG. 6D illustrates a filtering tree representing a third query.
Figure 6E:
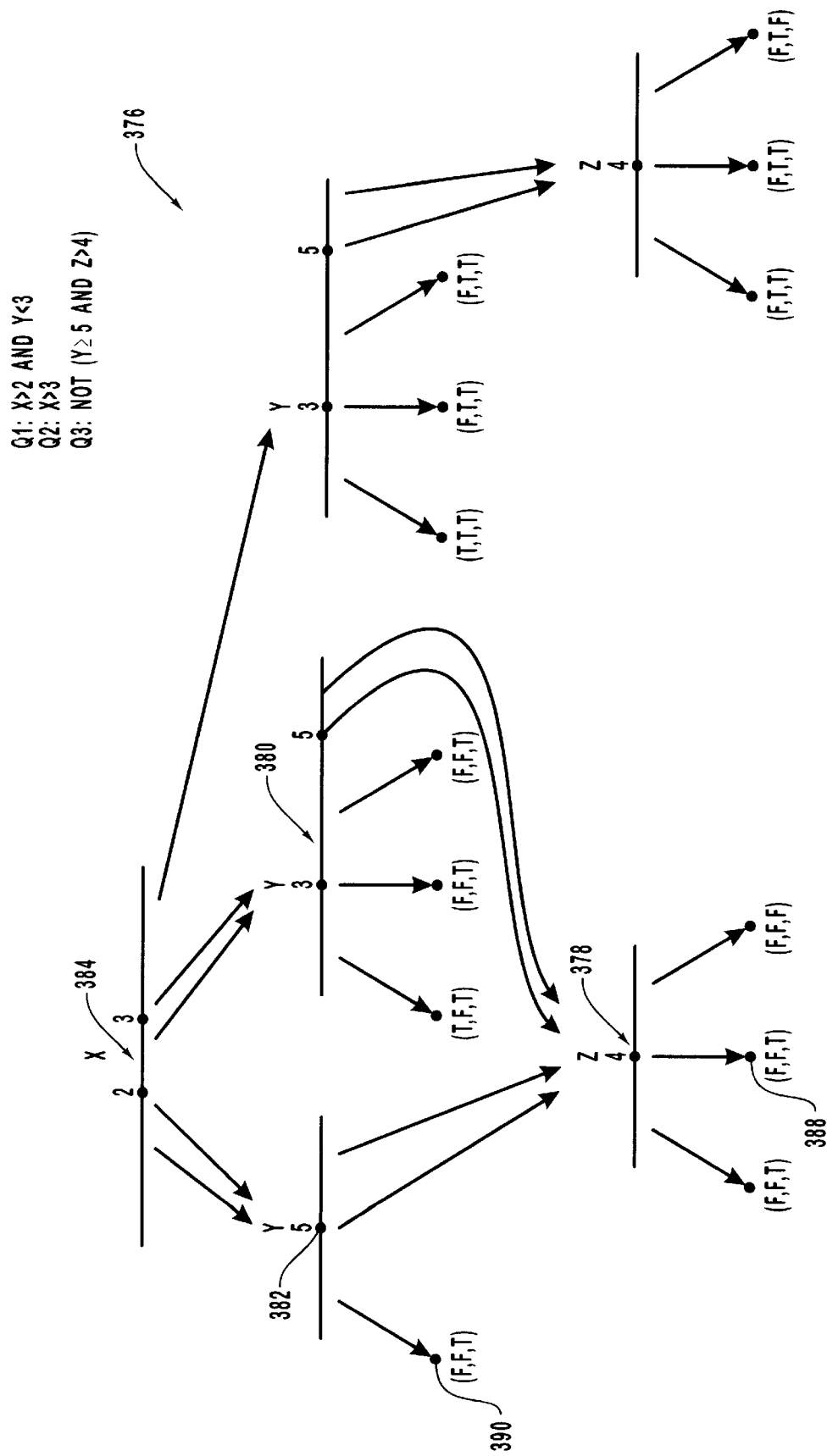
FIG. 6E depicts the filtering tree of FIG. 6C having been augmented with the logical operations of the third query.

FIGS. 6D and 6E illustrate further expansion of filtering tree 334 of FIG. 6C to include the logical operations of query Q3:

Q3) select * from ⟨object⟩ where not ($y \geq 5$ and $z > 4$)

For convenience, the negative logical expression "not ($y \geq 5$ and $z>4$)" can be converted to its positive logical equivalent "y<5 or $z \leq 4$." Filtering tree 360 of FIG. 6D represents the foregoing positive logical expression. Top-level node 362 has a number line 364 divided into three distinct regions: y<5, y=5, and y>5. An event having a y parameter falling within the first of these distinct regions, y<5, necessarily satisfies query Q3. As a result, leaf node 366 is assigned a true value and depends from the region y<5, thereby avoiding the need to consider the value of the z parameter. Non-leaf node 368, which depends from regions y=5 and y>5, corresponds to the z parameter of the logical expression of query Q3. Depending on the value of the z parameter of the event under consideration, query Q3 can have a true result as shown by leaf nodes 370 and 372 or a false value as shown by leaf nodes 374.

Filtering tree 376 of FIG. 6E represents filtering tree 334 of FIG. 6C augmented with filtering tree 360 of FIG. 6D. Thus, filtering tree 376 represents the logical expressions of queries Q1, Q2, and Q3. Each leaf node of filtering tree 376 of FIG. 6E includes an ordered pair of three logical values to be assigned to the three queries represented by the filtering tree. FIG. 6E also illustrates that certain non-leaf nodes can depend from more than one parent node. For example, non-leaf node 378 depends from nodes 380 and 382. FIG. 6E further illustrates that, regardless of the path followed in traversing filtering tree 376, none of the parameters is considered more than once.

In order to illustrate an example of the methods for traversing the filtering trees of the invention, an event, D2, having the following parameter values will be compared with filtering tree 376.

D2) $x = 3$;

$y = 6$; and $z = 4$

When an event provider detects event D2, its parameters can be passed to event-filtering core 48 in computer system 32 of FIG. 3. Filtering tree 376 has been constructed to correspond with a particular event provider, and is stored at event-filtering core 48. Event-filtering core 48 begins traversing filtering tree 376 by first considering the value of the x parameter of event D2, as indicated by top-level node 384. The node is processed by determining which of the distinct regions of number line 386 includes the value of the x parameter. In one embodiment, a binary search can be iteratively conducted until the appropriate distinct region of the number line is identified. In this example, the x parameter equals 3, such that the region at x=3 is selected.

The process then advances to node 380, which depends from the region x=3 of number line 386. Again, the method includes the step of identifying which of the distinct regions of the non-leaf node includes the value of the parameter of the event. In this case, the y parameter of event D2 equals 6, and the distinct region y>5 is identified. The method then proceeds to node 378, which depends from the region y>5 of node 380. The value of the z parameter of event D2 is compared against node 378, with the result that leaf node 388 having the ordered set (false, false, true) is selected. Accordingly, the process of traversing filtering tree 376 for event D2 indicates that queries Q1 and Q2 are not satisfied, whereas query Q3 is satisfied.

In another example, event D3, having the following parameters, is compared with queries Q1, Q2, and Q3:

D3) $x = 2$;

$y = 4$; and $z = 4$

Traversing filtering tree for event D3 begins at node 384, and then advances to node 382 and leaf node 390. The ordered set of logical values of leaf node 390 is also (false, false, true). Although the leaf nodes encountered in the foregoing two examples assign the same logical values to the queries, the process of identifying the logical values allows the value of the z parameter not to be considered in the second example.

Figure 7:
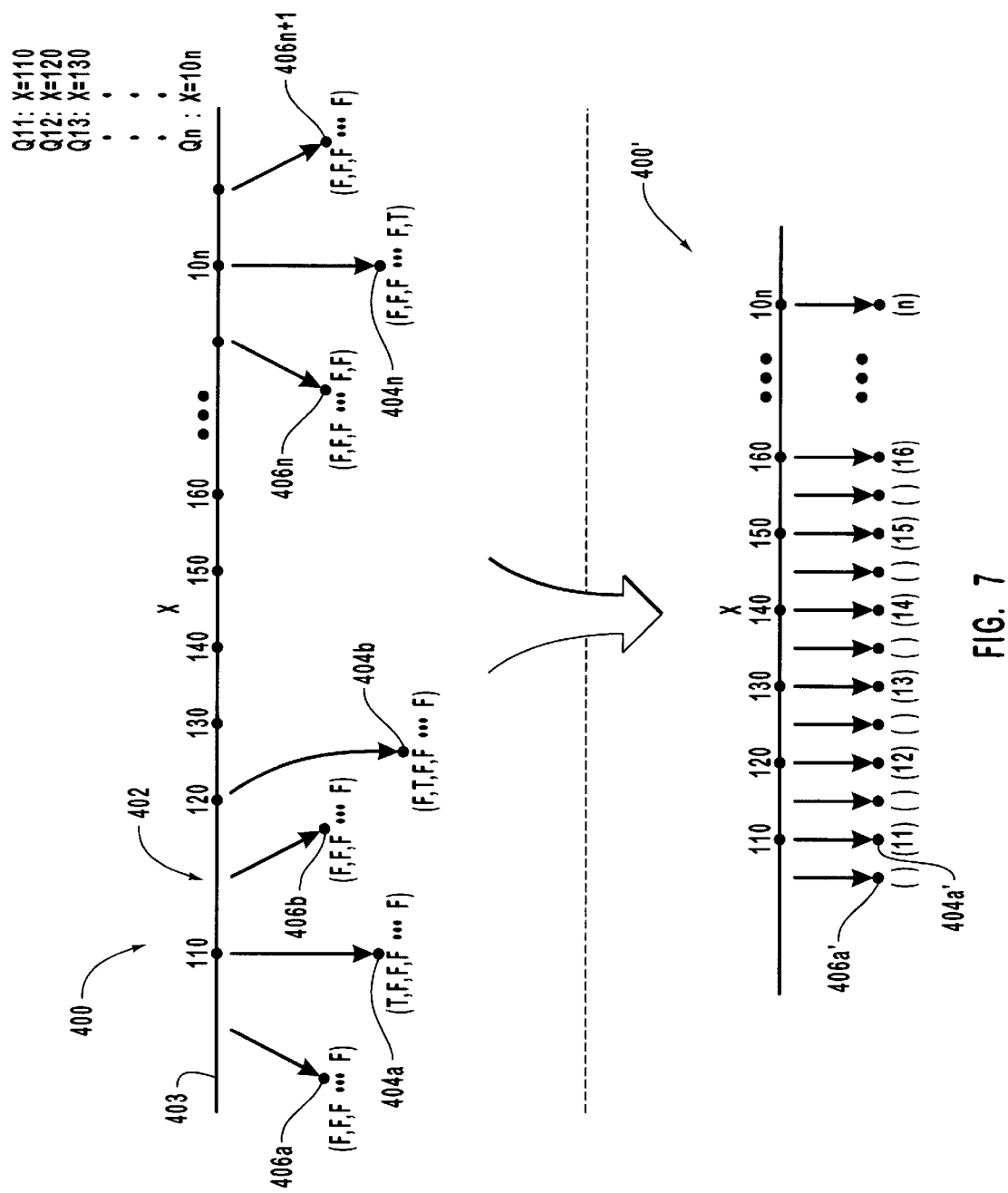
FIG. 7 illustrates a filtering tree constructed according to the invention, whereby an arbitrary number of queries are consolidated into a single tree.

Often, the efficiencies gained by simultaneously processing logical expressions of more than one query increase when the number of queries grows large. FIG. 7 illustrates a filtering tree constructed to represent a series of related queries Q11–Qn:

Q11) select * from ⟨object⟩
    where $x = 110$;

Q12) select * from ⟨object⟩
    where $x = 120$;

Q13) select * from ⟨object⟩
    where $x = 130$;

and so forth:

Qn) select * from ⟨object⟩
    where $x = 10n$.

Filtering tree 400 has only one non-leaf node 402, since the associated queries relate to only one parameter. Number line 403 of node 402 has n critical points, one for each of the associated queries. An event having an x parameter that is an exact multiple of 10 will satisfy one and only one query, while events having an x parameter that is not a multiple of 10 will not satisfy any query. Thus, as shown in FIG. 7, the ordered sets of logical values associated with leaf nodes 404a–404n have only one true value, whereas the leaf nodes 406a–406n+1 have no true values.

In order to further simplify filtering tree 400, the ordered sets of logical values can be compressed to contain only a value that corresponds to the particular query, if any, that has a true value at the leaf node. For example, filtering tree 400' has a leaf node 404a' that includes "11", which represents query Q11, thereby indicating that this query is true when leaf node 404a' is encountered. In contrast, leaf node 406a' has an empty set of associated true queries, since all the queries are false when leaf node 406a' is encountered.

The filtering trees of the invention can also be used to determine which of the event providers such as event providers 40, 42, and 44 of FIG. 3, are capable of detecting any events that are of interest to an event subscriber. As disclosed herein, event providers can be associated with event-reporting definitions. One example is the following query:

QP) select * from ⟨object⟩
    where $x > 10$

Query QP guarantees that the particular event provider will notify the event-filtering core only of those events having an x parameter that satisfies the logical expression "x>10." In this example, an event subscriber is associated with an event-filtering definition:

Q14) select * from ⟨object⟩
    where $x > 2$ and $y > 4$

Thus, the event subscriber has requested that the occurrence of any event having parameters satisfying the logical expression "x>2 and y>4" is to be reported thereto. The logical expressions of queries QP and Q14 are combined to construct filtering tree 410 of FIG. 8. Top-level node 412 has four separate child nodes 414, 416, 418, and 420. It is noted that the ordered set of logical values associated with leaf nodes 414 and 416 and with each of the leaf nodes 422, 424, and 426 that depend from node 418 assign a false value to query QP.

Figure 8:
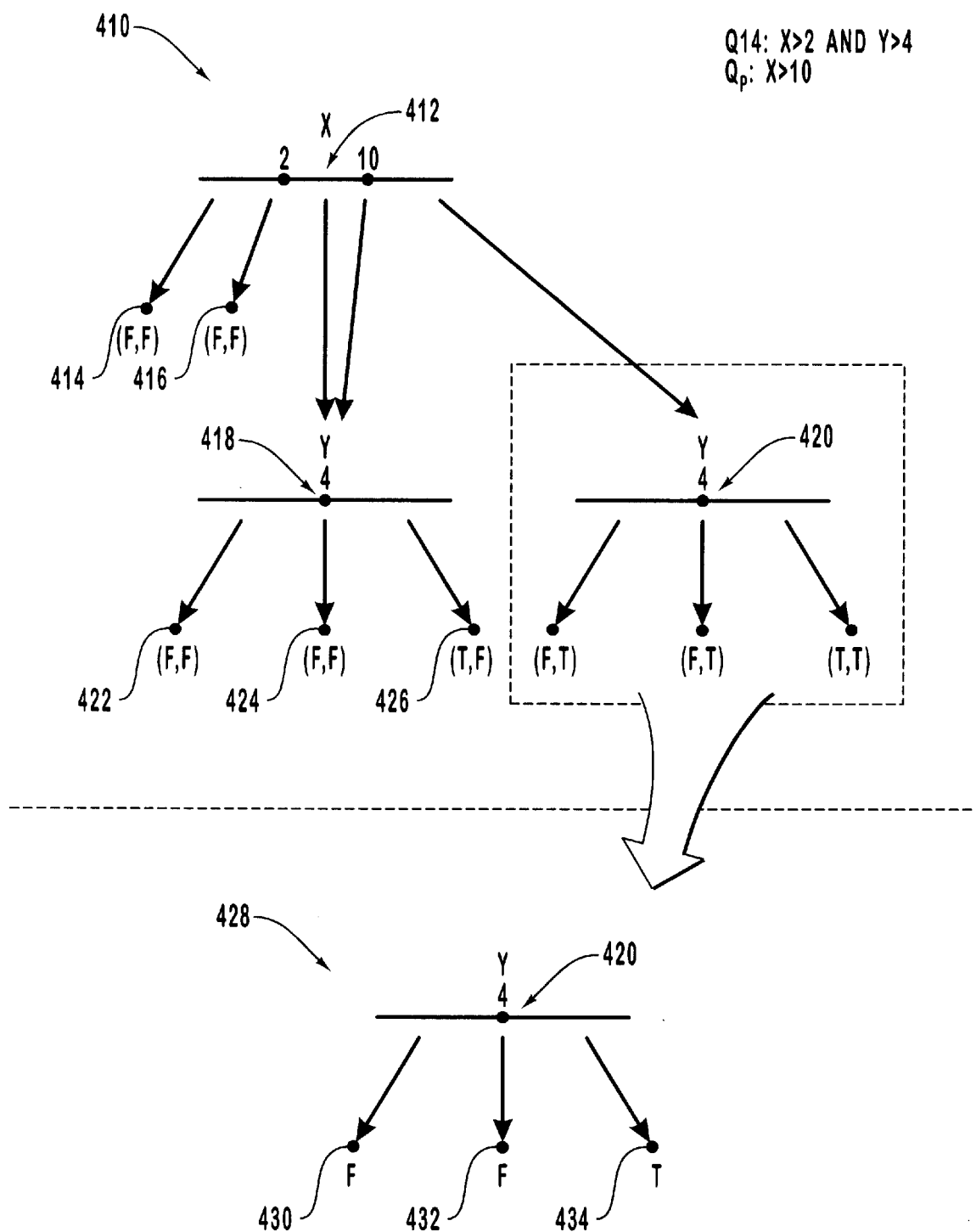
FIG. 8 depicts a filtering tree that combines an event-filtering definition associated with an event subscriber with an event-reporting definition associated with an event provider.

The false values can be interpreted as indicating that the event provider has guaranteed that it will not detect any events that could cause filtering tree 410 to be traversed to any of the leaf nodes 414, 416, 422, 424, and 426. Thus, any event detected by the event provider will cause filtering tree 410 to be traversed from top-level node 412 to non-leaf node 420. In other words, there is only one possible choice that can be made at top-level node 412. Thus, top-level node 412 adds no information to the filtering process and, as shown in FIG. 8, top-level node 412 and all other portions of filtering tree 410 other than node 420 can be discarded. When the event provider detects an event, the event-filtering core can use filtering tree 428, which consists of node 420 and leaf nodes 430, 432, and 434 that depend therefrom. The event-reporting definition QP registered by the event provider and filtering tree 410 eliminate the need to consider the value of the x parameter of the events detected by the event provider.

If the event-reporting definition registered by any event provider does not intersect with the event-filtering definition of any event subscriber, the resulting filtering tree constructed for the event provider will be an empty filtering tree. An event-reporting definition and an event-filtering definition intersect (as in FIG. 8) when there is at least one leaf node that has a (true, true) ordered set of logical value. If there is no node having a (true, true) ordered set of logical values, the filtering tree can be reduced to an empty filtering tree, and it can be concluded that there is no event subscriber that has an interest in any event detected by the particular event provider. When an event provider is associated with an empty filtering tree, the event provider can be disabled so as not to unnecessarily report events to the filtering core and increase data traffic within the system. Once an event subscriber registers an event-filtering definition that intersects with the event-reporting definition of a disabled event provider, the event provider can be enabled.

Figure 9A:
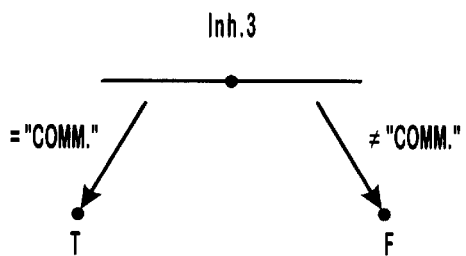
FIGS. 9A and 9B illustrate filtering trees associated with query-based definition specifying parameters having, as their values, objects defined in an object-oriented shema.
Figure 9B:
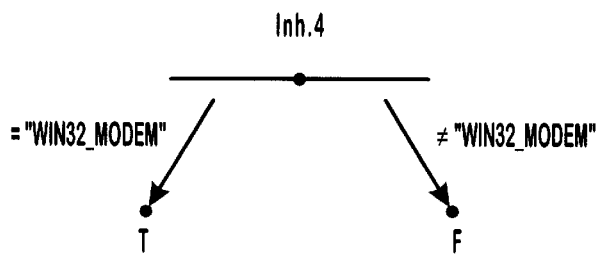
Figure 9C:
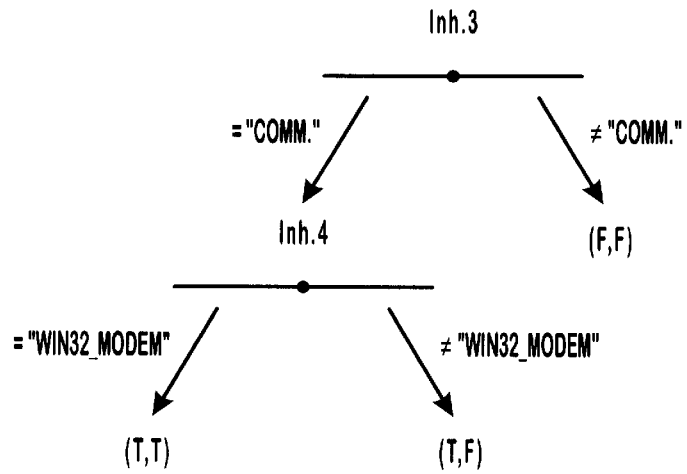
FIG. 9C illustrates a filtering tree that combines the logical operations of the query-based definitions of FIGS. 9A and 9B.

The foregoing filtering trees have been directed to queries and logical expressions that include numerical parameters and values. However, the principles of the invention extend to parameters having string values and parameters having as their value an object defined in the object-oriented schema. FIGS. 9A–9C illustrate one example of constructing and using filtering trees that relate to parameters having objects as their value.

In FIG. 9A, filtering tree 440 corresponds to the query:

Q15) select * from InstanceCreationEvent
    where TargetInstance isa "Communication_Device"

In this example, Communication_Device is a class defined in a schema similar to the schema depicted in FIG. 4. For instance, the class Communication_Device may be defined in a schema that includes the following classes:

Q2) class InstanceCreationEvent
    object TargetInstance;

Q3) class InstanceDeletionEvent
    object TargetInstance;

Q7) class Managed_System_Element [first level];

Q8) class Logic_Element [second level];

Q9) class Communication_Device [third level]; and

```
Q4)  class Win32_Modem
        int 32 speed [fourth level].
```

The levels indicate the position of the particular class in the inheritance model of the schema. In particular, the second level class is defined to be a child of the first level class, and so forth.

Filtering tree 440 includes only a single non-leaf node 442, since the associated query Q15 refers to only one parameter. Node 442 is labeled with the notation "Inh.3" to indicate that the class Communication_Device is at the third level in the inheritance model. There are two possibilities when an event having a TargetInstance parameter is compared against node 442. Specifically, the value of TargetInstance can be equal or not equal to "Communication_Device". Thus, depending on the value of the TargetInstance parameter, the process advances from node 442 to leaf node 444 or leaf node 446.

Turning now to FIG. 9B, filtering tree 450 represents the logical expression of the query:

```
Q16)  select * from InstanceCreationEvent
          where TargetInstance isa "Win32_Modem"
```

Filtering tree 450 has a single non-leaf node 452 labeled "Inh.4" to indicate that class C4 is at the fourth level of the inheritance model. Node 452 has two leaf nodes 454 and 456 depending therefrom, which are selected when the value of TargetInstance is equal to or not equal to Win32_Modem, respectively.

FIG. 9C illustrates a filtering tree 460 that combines the logical expressions of queries Q15 and Q16. It is first noted that an event that is an instance of the class Win32_Modem is also an instance of the parent classes of Win32_Modem, including the class Communication_Device. Thus, if an event has a parameter TargetInstance that does not have the value "Communication_Device", it necessarily does not have the value "Win32_Modem".

Filtering tree has a top-level node 462 similar to node 442 of FIG. 9A. When the TargetInstance parameter of an event does not have as its value "Communication_Device". there is no need to determine whether it has "Win32_Modem" as its value. Accordingly, leaf node 464 depends from the region "TargetInstance≠Communication_Device" of node 462, and has an ordered set of logical values (false, false). If, instead, the TargetInstance parameter of an event has "Communication_Device" as its value, the process of traversing filtering tree 460 advances to non-leaf node 466, which depends from the region "TargetInstance= Communication_Device" of node 462. Node 466 is similar to node 452 of FIG. 9B, and has a pair of leaf nodes 468 and 470 depending from its two distinct regions: "TargetInstance=Win32_Modem" and "TargetInstance≠Win32_Modem".

When the parameters of the logical expressions being processed have objects as their value, the top-level node of the corresponding filtering tree preferably relates to the class that has the highest level in the inheritance model. Constructing the filtering trees in this manner eliminates unnecessary comparison steps and reduces the computing resources and time that would otherwise be required.

Figure 10:
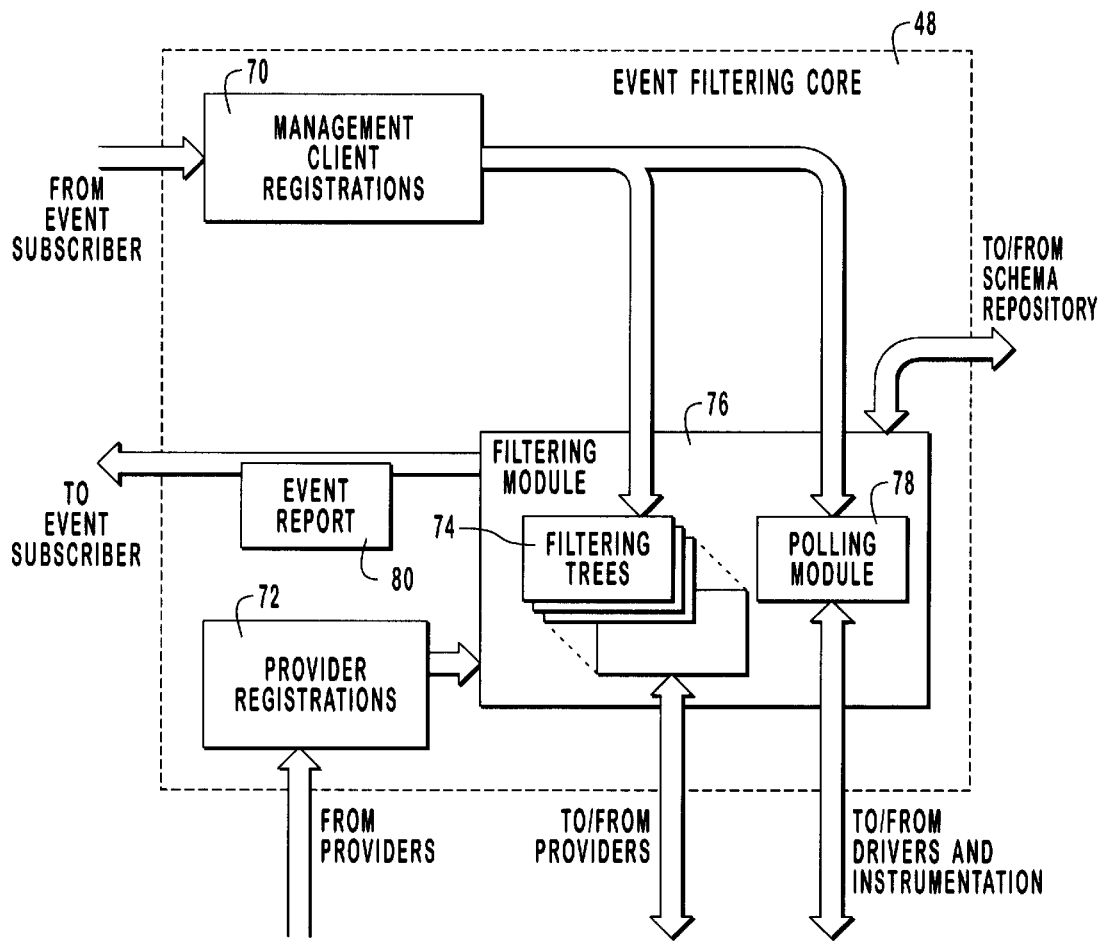
FIG. 10 is a schematic diagram further illustrating elements of the event-filtering core of FIG. 3.

FIG. 10 is a schematic diagram further illustrating features and elements of event-filtering core 48 of FIG. 3, including structure for constructing and calculating the filtering trees of the invention. Referring to FIG. 10, event-filtering core 48 includes, according to one embodiment of the invention, an event subscriber registrations repository 70 and a provider registrations repository 72. When event-filtering core 48 is initialized on a computer system or when an event subscriber 36 is installed, the event subscriber registers an event-filtering definition, examples of which are queries Q1–Q5 and Q8–Q15 presented above. Likewise, event providers 40, 42 and 44 register at provider registrations repository 72, an event-reporting definition, examples of which include queries Q6, Q7 and QP.

In this embodiment, event-filtering core 48 assembles one or more filtering trees 74. Filtering trees 74 may be the filtering trees described herein, and constitute an example of means for comparing a reported event against one or more event-filtering definitions associated with event subscribers. Each event provider can have one dedicated filtering tree 74 defined in filtering module 76. After comparing the reported events against the event-filtering definitions using filtering trees 74, any events satisfying the event-filtering definitions result in an event report 80 being sent to the appropriate event subscriber or subscribers.

In cases where no event provider exists on the computer system for notifying event-filtering core 48 of the occurrence of the particular events, a polling module 78 actively identifies when the particular events have occurred. For example, if a computer system includes a disk drive without an associated event provider and an event subscribers has requested a report of events at the disk drive, polling module 78 may periodically determine whether events of interest have occurred at the disk drive.

Figure 11:
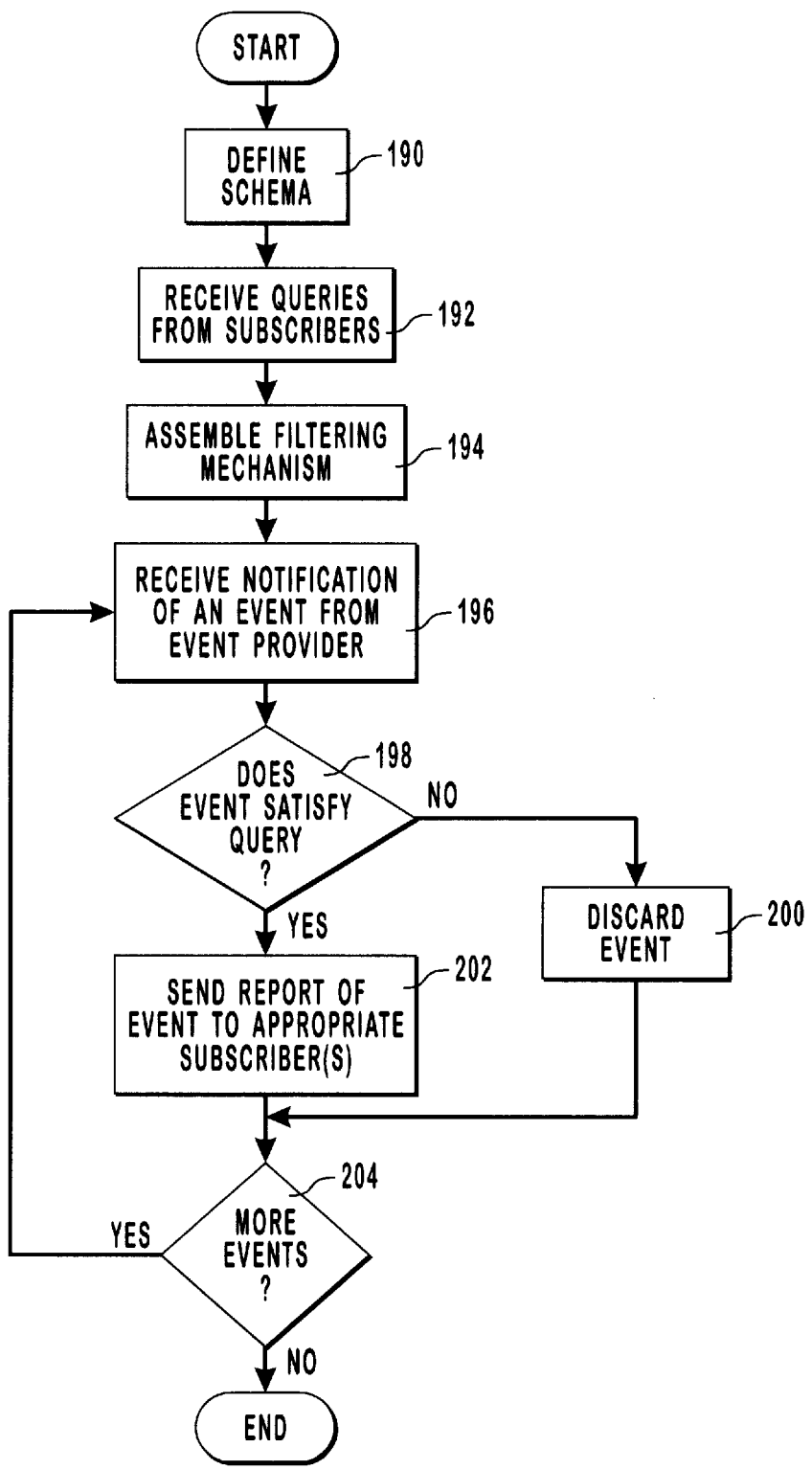
FIG. 11 is a flow diagram illustrating a method for filtering a plurality of events reported by event providers to identify the events to be reported to an event subscriber.

FIG. 11 depicts the steps of one embodiment of the methods for filtering events using, for example, the structure and event classifications illustrated in FIGS. 2–10. In step 190, the schema that organizes the hierarchical classification of event classes is defined according to the methods described herein. In step 192, the event-filtering core receives and registers queries from subscribers defining the subsets of events to be reported thereto. In step 194, the event-filtering core assembles a filtering mechanism based on the queries received from the subscribers and the event classification defined in the schema. Once the filtering mechanism is in place, event providers associated with the computer system provide notification of an event as illustrated by step 196.

According to decision block 198, the system determines whether the event detected in step 196 satisfies one or more queries associated with the event subscribers. If the event does not satisfy any query, the event is discarded in step 200 without being reported to an event subscriber. If, however, the event satisfies one or more of the queries, a report of the event is sent to the appropriate event subscriber or subscribers as illustrated by step 202. As shown in decision block 204, the method can continue detecting and reporting events as desired.

Time-Sensitive Event Filtering and Grouping
1. Event Aggregation

Figure 12:
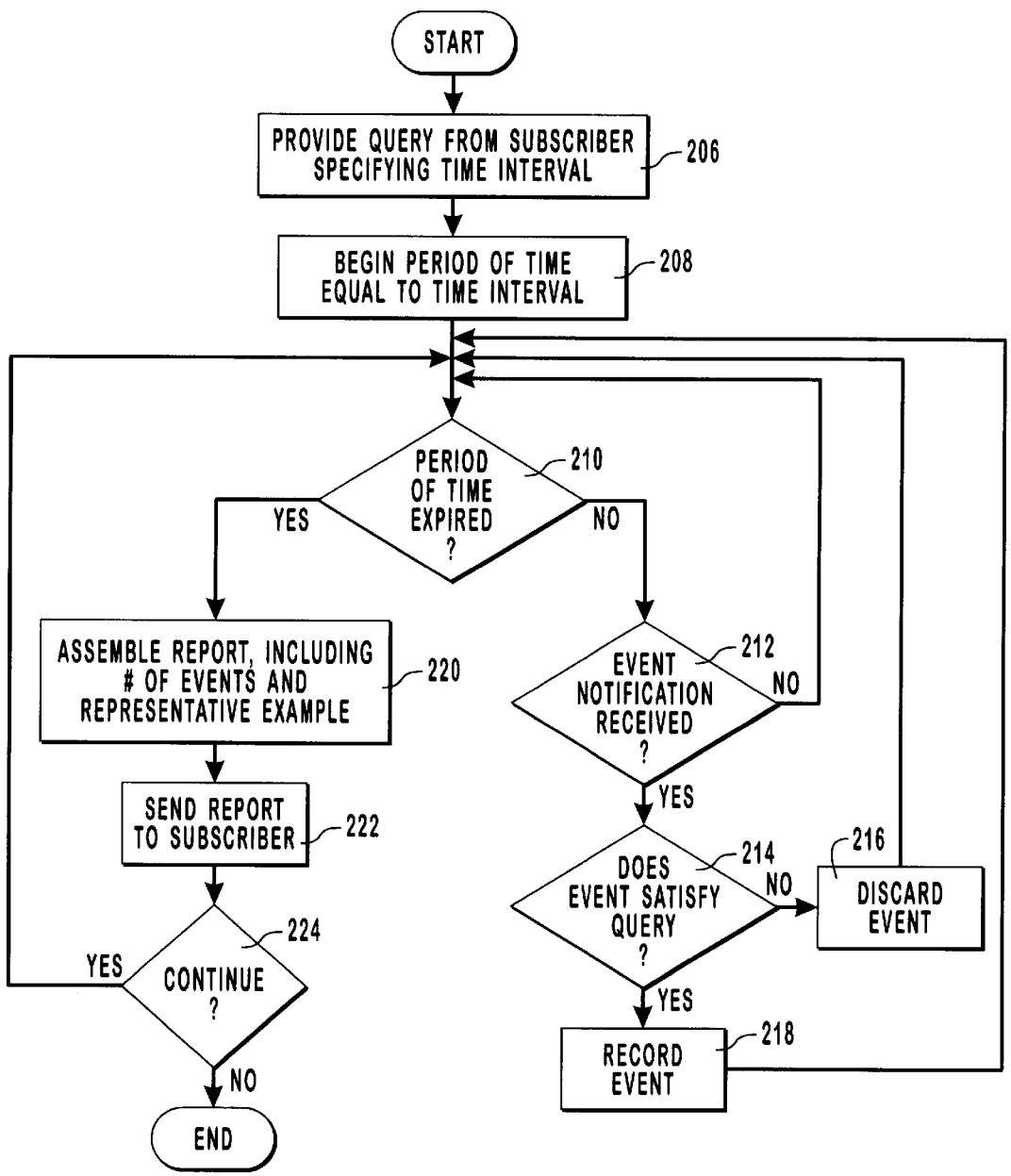
FIG. 12 is a flow diagram depicting a method for generating a report of events detected over a period of time, wherein the report is to be provided to the event subscriber.
Figure 13:
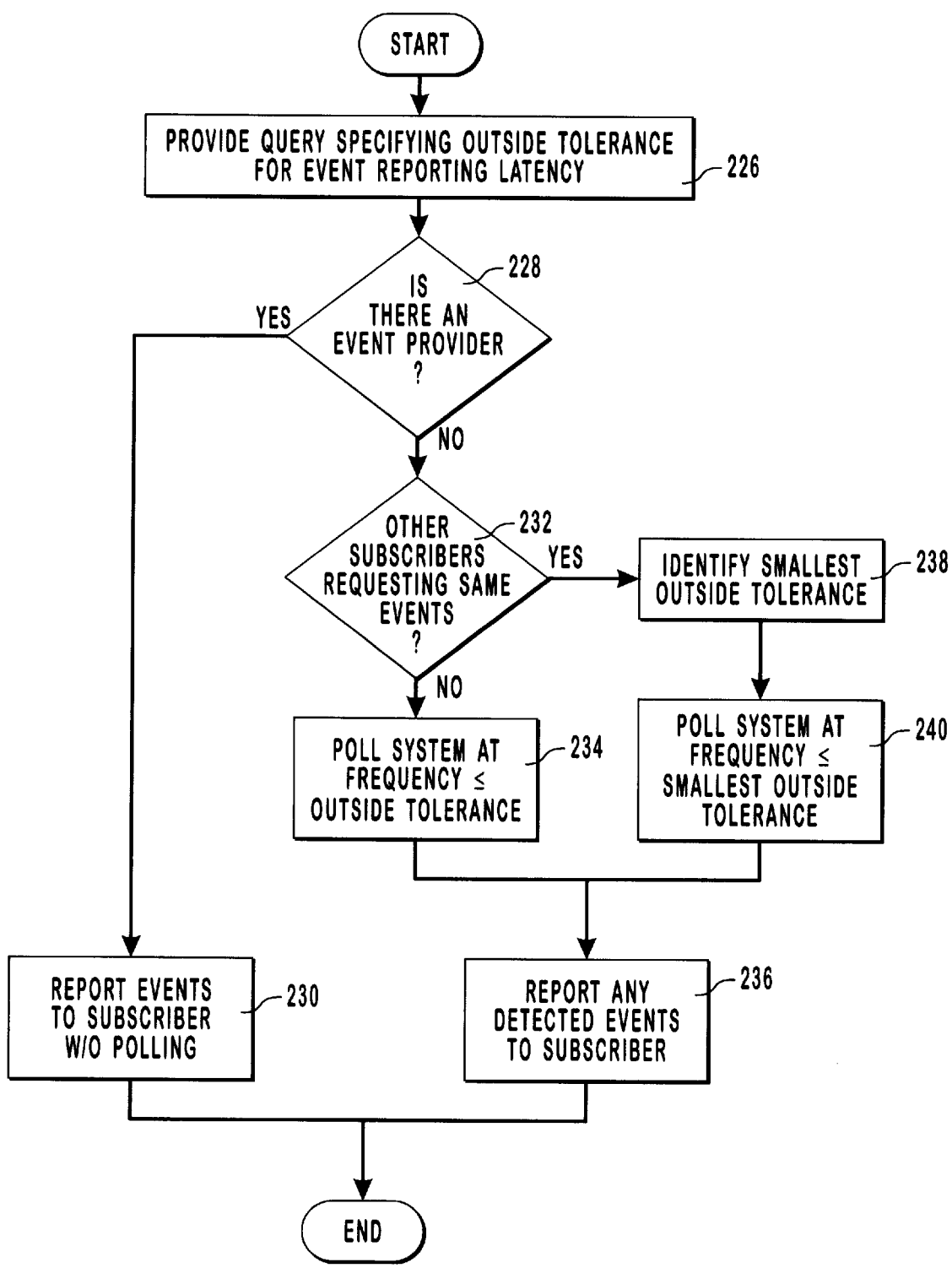
FIG. 13 is a flow diagram illustrating a method whereby the occurrence of a selected event is reported to the event subscriber within a period of time after its occurrence that is no greater than a maximum event reporting latency specified by the event subscriber.

FIGS. 12 and 13 depict methods whereby events are filtered, grouped, or both, based on the time that the events occur using a query language, such as SQL, that has been extended to include time-functional syntax. For example, some event subscribers may need only periodic reports or summaries of events that have occurred in a computer, a computer network, or in the environment of a computer system. An event subscriber may be interested to receive a report each day of the number of security breaches in a building. The event-filtering definition associated with such an event subscriber may be constructed:

Q17) select * from Building1_Breach group within 86400 by Entrance

This event-filtering definition indicates that the event subscriber is to receive a daily summary (every 86,400 seconds) of the number of security breaches in Building 1. The summary will group the events by the value of the parameter Entrance.

Another event subscriber might register an event-filtering definition:

Q18) select * from NetworkBreach group within 3600 having number of events > 10

This definition indicates that the event subscriber is to receive an hourly summary (every 3,600 seconds) of the number of network security breaches, but only if the number within the hour has been greater than 10. The foregoing examples are presented for illustrative purposes, and the queries in any particular situation may be as broad or narrow as desired.

FIG. 12 depicts a method for reporting and grouping events according to a query similar to query Q17. In step 206, the event subscriber registers an event-filtering definition that, like query Q17, requests only a periodic summary of the events satisfying the query. The event-filtering definition can include a time interval for the periodic reporting, which in the example of query Q17 is 86400 seconds.

Including the time interval in the query is particularly useful, for example, in situations where events happen relatively frequently and reporting individual events would generate considerable data traffic within the system. Instead, periodic summaries are generated according to this technique, thereby potentially significantly reducing the amount of data to be transmitted. The time interval is also useful when a summary of events is more manageable than real-time reports.

In step 208, the event-filtering core begins monitoring events during a period of time equal to the time interval specified in the query. According to decision block 210, if the period of time has not yet expired, the system continues to receive and monitor event notifications originating from the event providers. Decision block 210, along with decision block 212, indicates that the system continues to monitor events to be included in the summary so long as the period of time has not expired. As shown at decision block 212, if an event notification is received, the method proceeds to decision block 214, in which the event is compared to the event-filtering definition. If the event does not satisfy the definition, the method proceeds to step 216, in which the event is discarded, and the system continues to receive events. If, on the other hand, the event satisfies the query, the event is recorded in step 218 by the event-filtering core for later inclusion in the summary sent to the event subscriber. The routine comprising steps 210, 212, 214, 216, and 218 is repeated until the period of time expires, at which point the method advances from decision block 210 to step 220.

In step 220, the event-filtering core assembles the report that includes, in one embodiment, the number of events that have been detected during the period of time. The report can further include a representative example of the summarized events. When the event-filtering definition include a "group" clause as does query Q18, the report can group the events in the defined manner. In step 222, the report is sent to the subscriber. If the event-filtering core is to continue detecting and reporting events, the method proceeds from decision block 224 to decision block 210 as shown in FIG. 12.

2. Polling

FIG. 13 illustrates a method whereby drivers or other instrumentation that do not have associated event providers are periodically polled by the event-filtering core to learn of the occurrence of events. The method of FIG. 13 can be particularly useful to detect installation, deinstallation, or modification of hardware or software components. In order to manage the polling frequency, the event-filtering definitions can specify an outside tolerance of the event reporting latency that is to be allowed to elapse between the occurrence of an event and the reporting of the occurrence to the event subscriber.

In one implementation, the systems of the invention may be used to monitor the installation of modems in a computer network. In this case, the event classification in the schema repository could be supplemented with intrinsic event classes directed to the installation, deinstallation, and modification of hardware components, such as classes C2 and C3, above. Moreover, classes C2 and C3 and other intrinsic event classes can have one or more parameters that may have as their values particular data classes, such as classes C4–C6, defined above.

In this example, an event subscriber 36 could be associated with the event-filtering definition:

Q19) select * from InstanceCreationEvent within 3600 where TargetInstance is a "Win32_Modem"

This event-filtering definition specifies that the event subscriber is to receive reports of the installation of Win32 modems. In particular, when the occurrence of an InstanceCreationEvent (i.e., installation of hardware) is detected, and the parameter of the event has the value of "Win32_Modem", the event subscriber is to be notified.

Because modem installations and other intrinsic events often occur relatively infrequently, it might be considered inefficient to frequently check for their occurrence. In addition, there may not be an event provider dedicated to monitoring the installation of modems or other hardware. Accordingly, the clause "within 3600" of query Q19 instructs the event-filtering core 48 to poll the computers in the computer network at a frequency of once every hour (3,600 seconds) or fewer if there is no event provider to report modem installations. For example, polling module 78 of FIG. 10 can be used to execute the polling operation according to one embodiment. Extrinsic events can also be detected and reported using the polling procedures disclosed herein.

In this embodiment, the "within" clause specifies an outside tolerance of the reporting latency. If another event subscriber has, for example, an event-filtering definition:

Q20) select * from InstanceCreationEvent within 1800 where TargetInstance isa "Win32_Modem"

the system of the invention will poll, if polling is necessary, at a frequency of once every 30 minutes (1,800 seconds) or fewer.

FIG. 13 illustrates one method for polling the components of the computer system based on event-filtering definitions that, like queries Q19 and Q20, define an outside tolerance for event-reporting latency. In step 226, the event subscribers register event-filtering definitions including an outside tolerance for event reporting latency. In step 228, the event-filtering core or another component determines whether the system includes an event provider that will report any occurrences of the specified events. If so, the method proceeds to step 230, in which no polling is necessary, and events are reported as otherwise described herein. In this case, no polling is necessary since it can generally be assumed that events will be reported to the event-filtering core 48 at rates faster than the outside tolerance of the event reporting latency.

If, however, there is no event provider, which may be the case with respect to the queries Q19 and Q20, the method advances from decision block 228 to decision block 232. For purposes of illustration, it is assumed that query Q19 has been registered in step 226. According to decision block 232, it is determined that query Q20 has also been registered. Thus, the method advances to step 238, in which the smallest outside tolerance is identified. In this example, query Q19 has an outside tolerance of 3,600 seconds, whereas query Q20 has an outside tolerance of 1,800 seconds. In step 240, the system is polled periodically at a time interval no greater than the smallest tolerance (1,800 seconds). Therefore, in step 236, any detected events that satisfy the queries can be reported to both event subscribers at a frequency of once every 1,800 seconds or fewer, thereby meeting the demands of both outside tolerances.

If there had only been one subscriber requesting the events, the method would have proceeded from decision block 232 to step 234. For example, if only query Q19 had been registered, the system would have been polled in step 234 at a frequency of once every 3,600 seconds or fewer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for filtering information structures so as to select any of the information structures that satisfy a logical expression of at least one query, the method comprising the steps of:

providing a first query having a logical expression that defines a subset of the information structures that is to be selected;

constructing a filtering tree representing the logical expression, comprising the steps of:

creating a first non-leaf node of the filtering tree, the first non-leaf node representing a first operation associated with the logical expression;

creating a first leaf node and a second leaf node, each having a logical value to be assigned to the first query when the particular leaf node is encountered during a process of traversing the filtering tree, each of the first leaf node and the second leaf node depending directly or indirectly from in the first non-leaf node; and storing, in a computer-readable medium accessible by a computer system, computer-executable code for traversing the filtering tree.

2. A method as defined in claim 1, further comprising the steps of:

providing a second query having a second logical expression that defines another subset of the information structures that is to be selected; and creating a second node of the filtering tree, the second non-leaf node depending from the first non-leaf node and representing a second operation, the second operation being associated with the second logical expression.

3. A method as defined in claim 1, further comprising the step of providing a second query having a second logical expression that defines another subset of the information structures that is to be selected, wherein the first non-leaf node further represents a second operation, the second operation being associated with a logical operation of the second query.

4. A method as defined in claim 1, further comprising the steps of:

comparing the first operation represented by the first-level node with a value of a parameter of the information structure so as to determine which of two or more child nodes depending from the first-level node is to be considered next;

continuing to compare operations represented by any successive non-leaf nodes with the value of corresponding parameters of the information structure until one of the first leaf node and the second leaf node is encountered; and assigning the value of the encountered leaf node to the first query.

5. A method as defined in claim 1, wherein the information structure is included in a relational database.

6. A method as defined in claim 1, wherein the information structure is an event detected by the computer system.

7. In a computer system, a method for assembling a filtering tree representing operations whereby a detected event can be simultaneously compared to logical expressions of at least a first query and a second query, the method comprising the steps of:

communicating the first query and the second query to an event-filtering component of the computer system, the first query and the second query being satisfied when the value of one or more parameters of a detected event satisfy the conditions of a logical expression of the particular query;

creating a first non-leaf node of the filtering tree, the first non-leaf node representing a first operation associated with the logical expression of the first query;

creating a first leaf node and a second leaf node, each having an ordered set of logical values to be assigned to the first query and the second query when the particular leaf node is encountered during a process of traversing the filtering tree, each of the first leaf node and the second leaf node depending directly or indirectly from the first non-leaf node; and storing, in a computer-readable medium accessible by the computer system, computer-executable code for traversing the filtering tree.

8. A method as defined in claim 7, further comprising the step of creating a second non-leaf node of the filtering tree, the second non-leaf node depending from the first non-leaf node and representing a second operation, the second operation being associated with the logical expression of the second query.

9. A method as defined in claim 8 wherein the first non-leaf node further represents a another operation, the other operation being associated with the logical expression of the second query.

10. A method as defined in claim 7, wherein the first non-leaf node further represents a second operation, the second operation being associated with the logical expression of the second query.

11. A method as defined in claim 10, wherein the first operation specifies that a parameter of the detected event is to be compared to a first value and wherein the second operation specifies that the parameter is to be compared to a second value.

12. A method as defined in claim 11, wherein the first value and the second value are different.

13. In a computer system, a method for traversing a filtering tree so as to execute operations for comparing a detected event with at least one filtering query associated with one or more event subscribers, the method comprising the steps of:
   providing the filtering tree, wherein the filtering tree includes at least:
      a first-level non-leaf node representing a first operation associated with a logical expression of a first query selected from the at least one filtering query, the first-level node having child nodes depending therefrom;
      a first leaf node depending directly or indirectly from the first-level node, the first leaf node being associated with a false value; and
      a second leaf node depending directly or indirectly from the first-level node, the second leaf being associated with a true value;
   comparing the first operation represented by the first-level node with a value of a parameter of the detected event so as to determine which of the child nodes is to be considered next;
   continuing to compare operations represented by any successive non-leaf nodes with the value of corresponding parameters of the detected event until one of the first leaf node and the second leaf node is encountered; and
   assigning the value of the encountered leaf node to the first query.

14. A method as defined in claim 13, wherein one of the child nodes is a second-level node representing another operation associated with the logical expression of the first query.

15. A method as defined in claim 13, wherein the value of the encountered leaf node is a true value, the method further comprising the step of notifying an event subscriber associated with the first query of the occurrence of the event.

16. A method as defined in claim 13, wherein the step of comparing the first operation comprises the step of performing a binary search, whereby the value of the parameter is repeatedly compared to the first operation represented by the first node.

17. A method as defined in claim 13, wherein the first-level non-leaf node further represents a second operation, the second operation being associated with a logical expression of a second query selected from the at least one filtering query.

18. A method as defined in claim 17, further comprising the step of comparing the second operation represented by the first non-leaf node with the value of the parameter, so as to further determine which of the child nodes is to be considered next, the step of comparing the second operation being conducted simultaneously with the step of comparing the first operation.

19. A method as defined in claim 13, wherein said one of the first leaf node and the second leaf node is encountered without the method comparing at least one operation associated with the logical expression of the first query with a value of the corresponding parameter of the detected event.

20. A method as defined in claim 13, further comprising the step of providing a plurality of said filtering trees, wherein each of said filtering trees is associated with one of a plurality of event providers.

21. A method as defined in claim 20, further comprising conducting, for each one of the plurality of filtering trees, the steps of:
   traversing said one of the plurality of filtering trees until one of the leaf nodes of said one of the plurality of filtering trees is encountered; and
   assigning, to each of one or more event-filtering queries associated with said one or more of the plurality of filtering trees, a logical value contained in an ordered set of one or more logical values associated with the encountered leaf node.

22. A method as defined in claim 13, further comprising the step of determining that an event provider is associated with an empty filtering tree that indicates that the event provider does not report any event for which notification is to be made to any of the one or more event subscribers.

23. A method as defined in claim 22, further comprising the step of deactivating the event provider.

24. In a computer system including one or more event providers for detecting the occurrence of events and one or more events subscribers for receiving notification of the occurrence of a subset of the events, a method of determining whether a selected event provider can detect events for which notification is to be made to any of the one or more event subscribers, comprising the steps of
   communicating one or more event-filtering queries to an event-filtering component of the computer system, wherein each event subscriber is associated with one event-filtering query and wherein each event-filtering query specifies a subset of events for which notification is to be made to the associated event subscriber;
   communicating an event-reporting query associated with one event provider to the event-filtering component, wherein the event-reporting query indicates that the associated event provider can report only events satisfying a logical expression of the event-filtering query;
   determining that there is no possible event that both satisfies the logical expression of the event-filtering query and is included in any of said subsets of events; and
   deactivating said one provider such that it does not report the occurrence of any event to the event-filtering component.

25. A method as defined in claim 24, further comprising the steps of:
   determining that there is a possible event that both satisfies a logical expression of another event-filtering query associated with another one of the event providers and is included in at least one of said subsets of events; and
   activating said other one of the event providers.

26. A method as defined in claim 24, wherein the step of determining that there is no possible event comprises the steps of:

constructing a filtering tree representing all operations of the logical expressions of all the event-filtering queries and all operations of the logical expression of the event-reporting query, the filtering tree including:
a first non-leaf node representing at least one operation selected from at least one of the logical expressions of the event-filtering queries and the logical expression of the event-reporting query; and
a plurality of leaf nodes depending directly or indirectly from the first non-leaf node, each of the leaf nodes having an ordered set of logical values to be assigned to the event-filtering queries and the event-reporting query when the particular leaf node is encountered while traversing the filtering tree; and determining that none of the leaf nodes has an ordered set of logical values that includes a true value to be assigned to the event-reporting query and a true value to be assigned to any one of the event-filtering queries.

27. A computer program product for implementing a computer-executed method of assembling a filtering tree that represents operations whereby an event detected by a computer system can be simultaneously compared to logical expressions of at least a first query and a second query, the computer program product comprising:

a computer-readable medium carrying computer-executable instructions for implementing the method, the computer-executable instructions comprising:
program code means for receiving a first query and a second query, wherein the first query and the second query are satisfied when the value of one or more parameters of a detected event satisfy the conditions of a logical expression of the particular query;
program code means for constructing a computer-executable routine for traversing a filtering tree so as to compare parameters of the detected event with the conditions of the logical expressions, the filtering tree including:
a first non-leaf node representing a first operation associated with the logical expression of the first query;
a first leaf node and a second leaf node, each having an ordered set of logical values to be assigned to the first query and the second query when the particular leaf node is encountered while traversing the filtering tree, each of the first leaf node and the second leaf node depending directly or indirectly from the first non-leaf node.

28. A computer program product as defined in claim 27, wherein the computer-executable instructions further comprise program code means for assigning the logical values of the ordered set to the first query and the second query.

29. A computer program product as defined in claim 28, wherein the computer-executable instructions further comprise program code means for notifying an event subscriber associated with the first query of the occurrence of the event when the first query is assigned a true logical value.

30. A computer program product as defined in claim 27, wherein the filtering tree further comprises a second non-leaf node depending from the first non-leaf node and representing a second operation, the second operation being associated with the logical expression of the second query.

31. A computer program product as defined in claim 27, wherein the first non-leaf node further represents another operation, the other operation being associated with the logical expression of the second query.

* * * * *

UNITED STATES PATENT AND TRADEMARK OFFICE
CERTIFICATE OF CORRECTION

PATENT NO. : 6,253,195 B1
DATED : June 26, 2001
INVENTOR(S) : Irena Hudis, Raymond McCollum, Lev Novik It is certified that error appears in the above-identified patent and that said Letters Patent is hereby corrected as shown below:

Column 2,
Line 9, after "12" insert -- , --
Line 57, change "agrain" to -- again --

Column 3,
Line 19, after "reducing" delete [,]

Column 4,
Line 32, after "filtering" delete [,]

Column 7,
Line 47, after "129" change "." to -- , --

Column 8,
Line 21, after "thereof" change ";" to -- , --

Column 10,
Line 34, after "event-filtering" delete [,]
Line 66, change "Building1-$n_{13}$ Breach" to -- Building1-n Breach --

Column 13,
Line 19, after "are" delete [ail]

Column 14,
Line 59, after "receiving" delete [,]

Column 17,
Line 9, after "respectively" insert -- . --

Column 21,
Line 45, after "Device" change "." to -- , --

UNITED STATES PATENT AND TRADEMARK OFFICE
CERTIFICATE OF CORRECTION

PATENT NO.    : 6,253,195 B1
DATED         : June 26, 2001
INVENTOR(S)   : Irena Hudis, Raymond McCollum, Lev Novik It is certified that error appears in the above-identified patent and that said Letters Patent is hereby corrected as shown below:

<u>Column 27,</u>
Line 7, after "8" insert -- , --

Signed and Sealed this

Second Day of April, 2002

*Attest:*

JAMES E. ROGAN
*Attesting Officer          Director of the United States Patent and Trademark Office*